US012340745B2

(12) United States Patent
Yang et al.

(10) Patent No.: US 12,340,745 B2
(45) Date of Patent: Jun. 24, 2025

(54) DISPLAY DEVICE

(71) Applicant: SAMSUNG DISPLAY CO., LTD., Yongin-si (KR)

(72) Inventors: Jin-Wook Yang, Yongin-si (KR); Donggyu Lee, Yongin-si (KR); Jae-Hyeon Jeon, Yongin-si (KR); Yu-Chol Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/391,894

(22) Filed: Dec. 21, 2023

(65) Prior Publication Data

US 2024/0404464 A1 Dec. 5, 2024

(30) Foreign Application Priority Data

Jun. 1, 2023 (KR) ........................ 10-2023-0070886

(51) Int. Cl.
*G09G 3/20* (2006.01)
*G09G 3/3233* (2016.01)
*G09G 3/3258* (2016.01)

(52) U.S. Cl.
CPC ......... *G09G 3/3233* (2013.01); *G09G 3/2007* (2013.01); *G09G 3/3258* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01); *G09G 2320/045* (2013.01); *G09G 2330/021* (2013.01)

(58) Field of Classification Search
CPC ...... G09G 3/32; G09G 3/3233; G09G 3/2007; G09G 3/3258
See application file for complete search history.

(56) References Cited

U.S. PATENT DOCUMENTS

| | | | | |
|---|---|---|---|---|
| 11,263,976 B2 | 3/2022 | Yang et al. | | |
| 2016/0189635 A1* | 6/2016 | Lee | G09G 3/3291 345/77 | |
| 2017/0193959 A1* | 7/2017 | No | G09G 3/3688 | |
| 2021/0043149 A1* | 2/2021 | Yoo | G09G 3/3291 | |
| 2023/0196983 A1* | 6/2023 | Hong | G09G 3/32 345/55 | |

FOREIGN PATENT DOCUMENTS

| | | |
|---|---|---|
| KR | 10-2016-0033352 | 3/2016 |
| KR | 10-2021-0017876 | 2/2021 |
| KR | 10-2021-0100785 | 8/2021 |
| KR | 10-2023-0139915 | 10/2023 |

* cited by examiner

*Primary Examiner* — Kevin M Nguyen
(74) *Attorney, Agent, or Firm* — F. CHAU & ASSOCIATES, LLC

(57) ABSTRACT

A display device including: a display panel including a pixel; and a panel driver configured to provide a reference voltage and a data voltage to the pixel, wherein the pixel emits light with a luminance corresponding to a difference between the reference voltage and the data voltage, and when the reference voltage changes, and a range of the data voltage is shifted by a voltage level that corresponds to the amount of change in the reference voltage.

10 Claims, 22 Drawing Sheets

CP

DISPLAY DEVICE

CROSS-REFERENCE TO RELATED APPLICATION(S)

This application claims priority under 35 U.S.C. § 119 to Korean Patent Application No. 10-2023-0070886, filed on Jun. 1, 2023 in the Korean Intellectual Property Office (KIPO), the disclosure of which is incorporated by reference herein in its entirety.

1. TECHNICAL FIELD

Embodiments of the present inventive concept relate to a display device, and more particularly to a display device including a pixel that emits light with a luminance corresponding to a difference between a reference voltage and a data voltage.

2. DESCRIPTION OF THE RELATED ART

Unlike a Liquid Crystal Display (LCD) device which necessitates a backlight unit, self-luminous display devices, like Organic Light Emitting Diode (OLED) displays, do not require an independent light source. This allows them to be thinner and lighter. Further, these self-luminous displays offer benefits, such as high brightness, fast response speed and high image quality. Accordingly, they are an ideal choice for portable electronic devices like smartphones, tablets and laptops.

Additionally, a display device utilized in portable electronic devices needs to minimize its power consumption.

SUMMARY

Some embodiments of the present inventive concept provide a display device capable of reducing power consumption.

An embodiment of the present inventive concept provides a display device including: a display panel including a pixel; and a panel driver configured to provide a reference voltage and a data voltage to the pixel, wherein the pixel emits light with a luminance corresponding to a difference between the reference voltage and the data voltage, and when the reference voltage changes, and a range of the data voltage is shifted by a voltage level that corresponds to the amount of change in the reference voltage.

An analog power supply voltage supplied to an analog circuit of the panel driver changes by the voltage level that corresponds to the amount of change in the reference voltage.

When the reference voltage decreases, the range of the data voltage is shifted in a negative direction by a voltage level that corresponds to the amount of decrease in the reference voltage.

A maximum data voltage corresponding to a minimum gray level is decreased by the voltage level that corresponds to the amount of decrease in the reference voltage, and wherein a minimum data voltage corresponding to a maximum gray level is decreased by the voltage level that corresponds to the amount of decrease in the reference voltage.

An analog power supply voltage supplied to an analog circuit of the panel driver is decreased by the voltage level that corresponds to the amount of decrease in the reference voltage.

The pixel generates a driving current based on the difference between the reference voltage and the data voltage, and emits light based on the driving current.

The pixel includes: a storage capacitor including a first electrode connected to a first node, and a second electrode connected to a second node; a first transistor including a gate connected to the second node; and a light emitting element, wherein, in a compensation period, the reference voltage is applied to the first node, and a voltage of the second node becomes a voltage obtained by subtracting a threshold voltage of the first transistor from a power supply voltage, and wherein, in a data writing period, the data voltage is applied to the first node, and the voltage of the second node is changed by the difference between the reference voltage and the data voltage.

In an emission period, the power supply voltage is applied to a source of the first transistor, and a source-gate voltage of the first transistor corresponds to the reference voltage minus the data voltage plus the threshold voltage.

In the emission period, the first transistor generates a driving current, the light emitting element emits light based on the driving current, and the driving current is determined by an equation, "IDR=k*(VREF−VDAT)^2", where IDR represents the driving current, k represents a constant, VREF represents the reference voltage, and VDAT represents the data voltage.

The pixel includes: a storage capacitor including a first electrode connected to a first node, and a second electrode connected to a second node; a hold capacitor including a first electrode connected to a line for transferring a first power supply voltage, and a second electrode connected to the first node; a first transistor including a gate connected to the second node, a first terminal connected to the line for transferring the first power supply voltage, and a second terminal; a second transistor including a gate for receiving a wiring signal, a first terminal connected to a data line, and a second terminal connected to the first node; a third transistor including a gate for receiving a compensation signal, a first terminal connected to the second terminal of the first transistor, and a second terminal connected to the second node; a fourth transistor including a gate for receiving an initialization signal, a first terminal connected to the second node, and a second terminal connected to a line for transferring an initialization voltage; a fifth transistor including a gate for receiving the compensation signal, a first terminal connected to the first node, and a second terminal connected to a line for transferring the reference voltage; a sixth transistor including a gate for receiving an emission signal, a first terminal connected to the second terminal of the first transistor, and a second terminal connected to an anode of an light emitting element; a seventh transistor including a gate for receiving a bypass signal, a first terminal connected to the anode of the light emitting element, and a second terminal connected to a line for transferring an anode initialization voltage; and the light emitting element including the anode, and a cathode connected to a line for transferring a second power supply voltage.

The pixel further includes an eighth transistor including a gate for receiving a second emission signal, a first terminal connected to the line for transferring the first power supply voltage, and a second terminal connected to the first terminal of the first transistor; and a ninth transistor including a gate for receiving the bypass signal, a first terminal connected to a line for transferring a bias voltage, and a second terminal connected to the first terminal of the first transistor.

The pixel further includes an eighth transistor including a gate for receiving the emission signal, a first terminal connected to the line for transferring the first power supply voltage, and a second terminal connected to the first terminal of the first transistor; a ninth transistor including a gate for receiving the bypass signal, a first terminal connected to a line for transferring a bias voltage, and a second terminal connected to the first terminal of the first transistor; and a tenth transistor including a gate for receiving the compensation signal, a first terminal connected to the line for transferring the first power supply voltage, and a second terminal connected to the first terminal of the first transistor.

An embodiment of the present inventive concept provides a display device including: a display panel including a pixel; and a panel driver configured to provide a reference voltage and a data voltage to the pixel, wherein the pixel emits light with a luminance corresponding to a difference between the reference voltage and the data voltage, wherein, in a first mode, the reference voltage has a first voltage level, and wherein, in a second mode, the reference voltage has a second voltage level different from the first voltage level.

A voltage level of a maximum data voltage corresponding to a minimum gray level in the second mode is different from a voltage level of the maximum data voltage in the first mode.

A voltage level of an analog power supply voltage supplied to an analog circuit of the panel driver in the second mode is different from a voltage level of the analog power supply voltage in the first mode.

The second voltage level of the reference voltage in the second mode is lower than the first voltage level of the reference voltage in the first mode.

A voltage level of a maximum data voltage corresponding to a minimum gray level in the second mode is lower than a voltage level of the maximum data voltage in the first mode.

A voltage level of an analog power supply voltage supplied to an analog circuit of the panel driver in the second mode is lower than a voltage level of the analog power supply voltage in the first mode.

The pixel generates a driving current based on the difference between the reference voltage and the data voltage, and emits light based on the driving current.

The first mode is a high dynamic range mode, and the second mode is a normal mode.

As described above, in a display device according to embodiments of the present inventive concept, each pixel may emit light with a luminance corresponding to a difference between a reference voltage and a data voltage, a voltage level of the reference voltage may be changed, and a range of the data voltage may be shifted by a voltage level that corresponds to the amount of change in the reference voltage. Accordingly, power consumption of the display device is reduced while a luminance of the display device is not changed.

BRIEF DESCRIPTION OF THE DRAWINGS

Illustrative, non-limiting embodiments of the present inventive concept will be more clearly understood from the following detailed description taken in conjunction with the accompanying drawings.

DETAILED DESCRIPTION OF THE EMBODIMENTS

Hereinafter, embodiments of the present inventive concept will be explained in detail with reference to the accompanying drawings.

Figure 1:
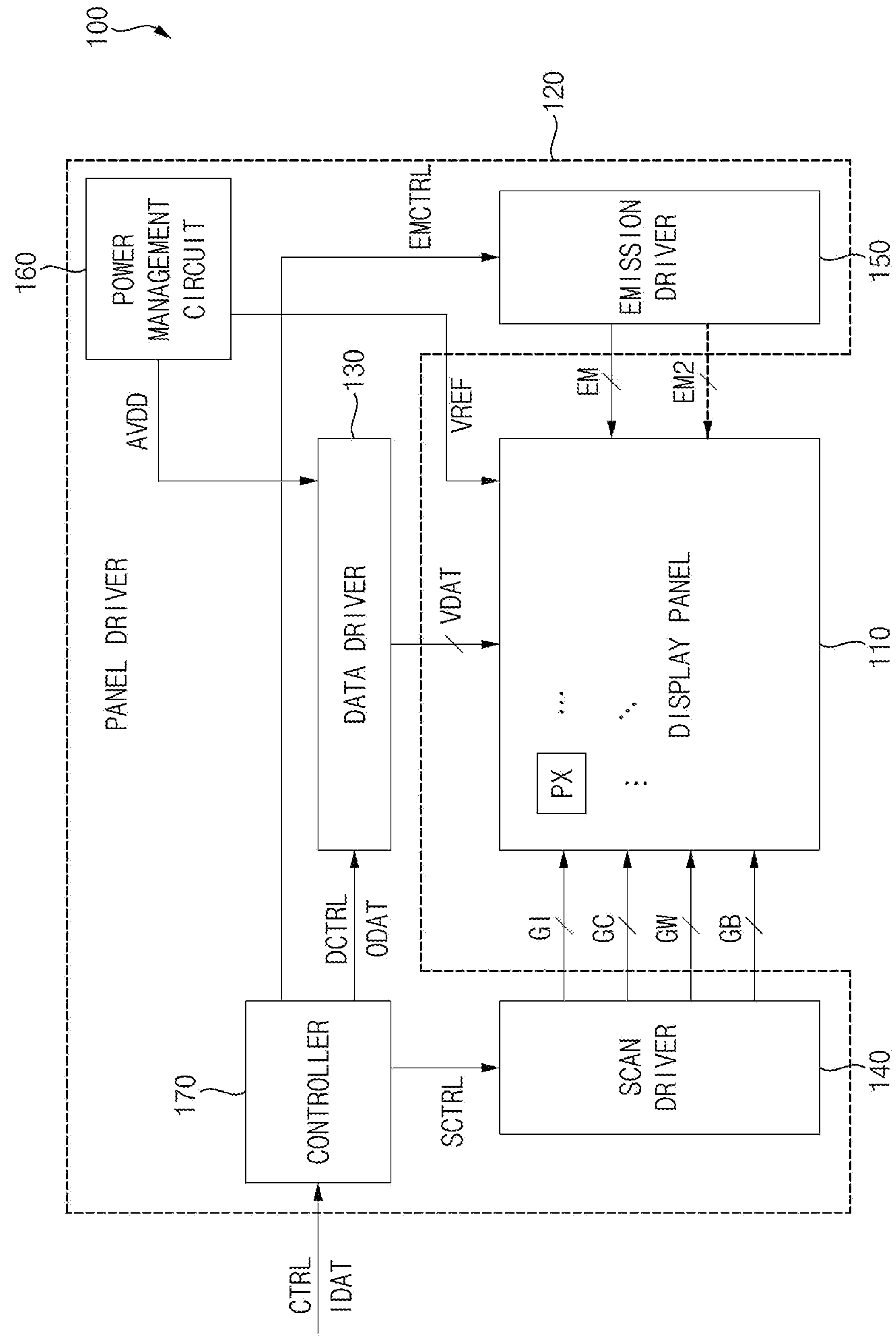
FIG. 1 is a block diagram illustrating a display device according to embodiments.
Figure 2:
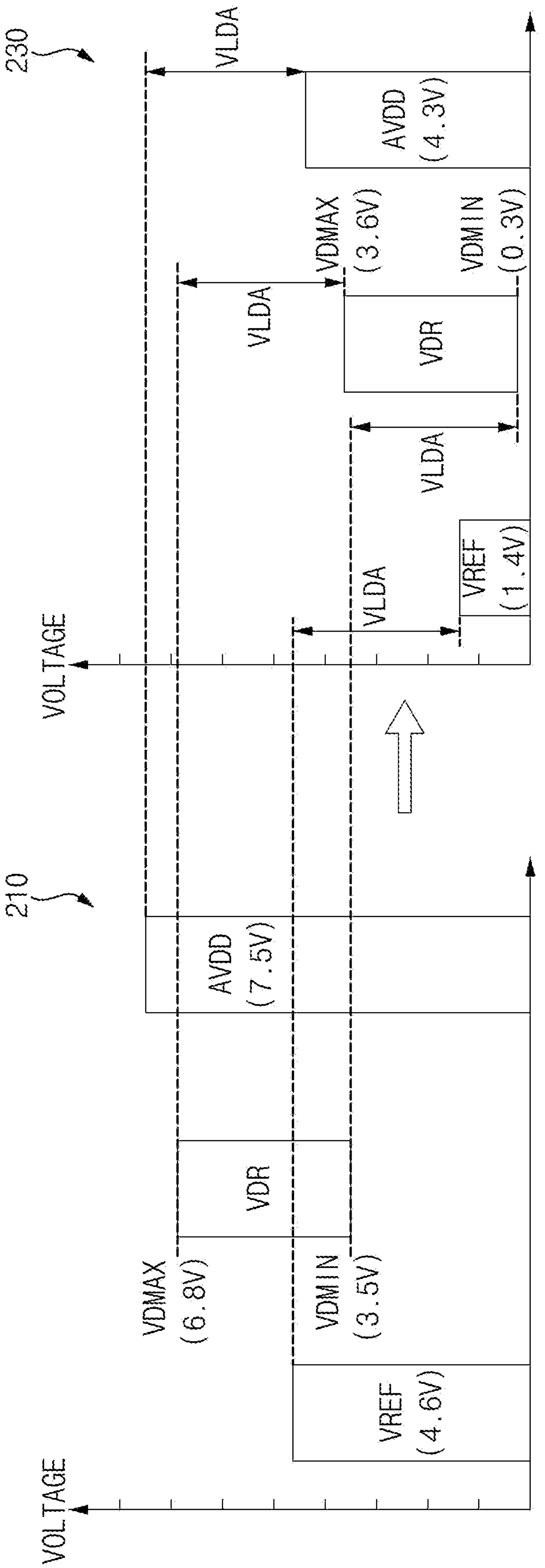
FIG. 2 is a diagram illustrating examples of a reference voltage, a data voltage range and an analog power supply voltage in a conventional display device and a display device according to embodiments.
Figure 3:
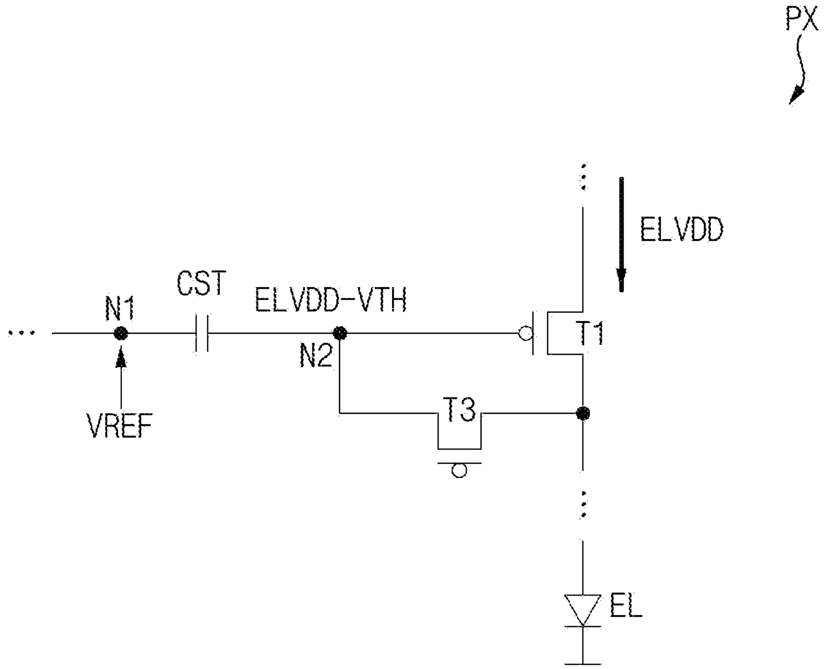
FIG. 3 is a circuit diagram illustrating a portion of a pixel for describing an operation of the pixel in a compensation period.
Figure 4:
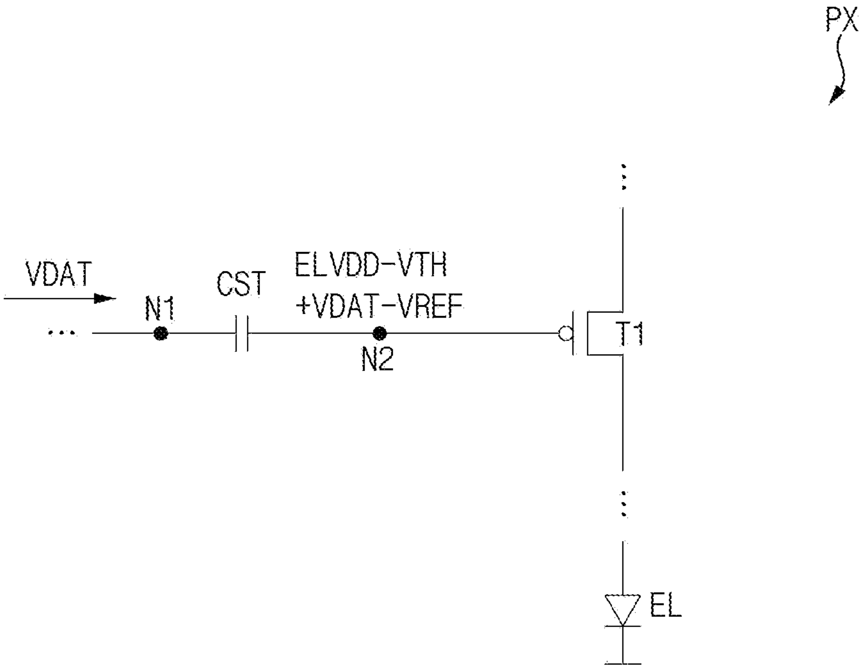
FIG. 4 is a circuit diagram illustrating a portion of a pixel for describing an operation of the pixel in a data writing period.
Figure 5:
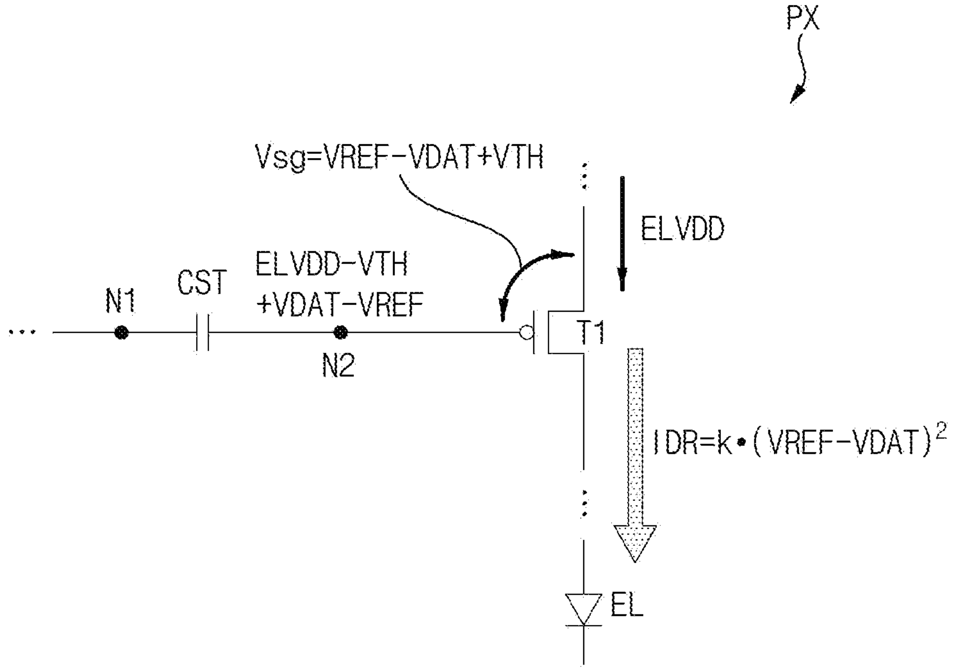
FIG. 5 is a circuit diagram illustrating a portion of a pixel for describing an operation of the pixel in an emission period.
Figure 6:
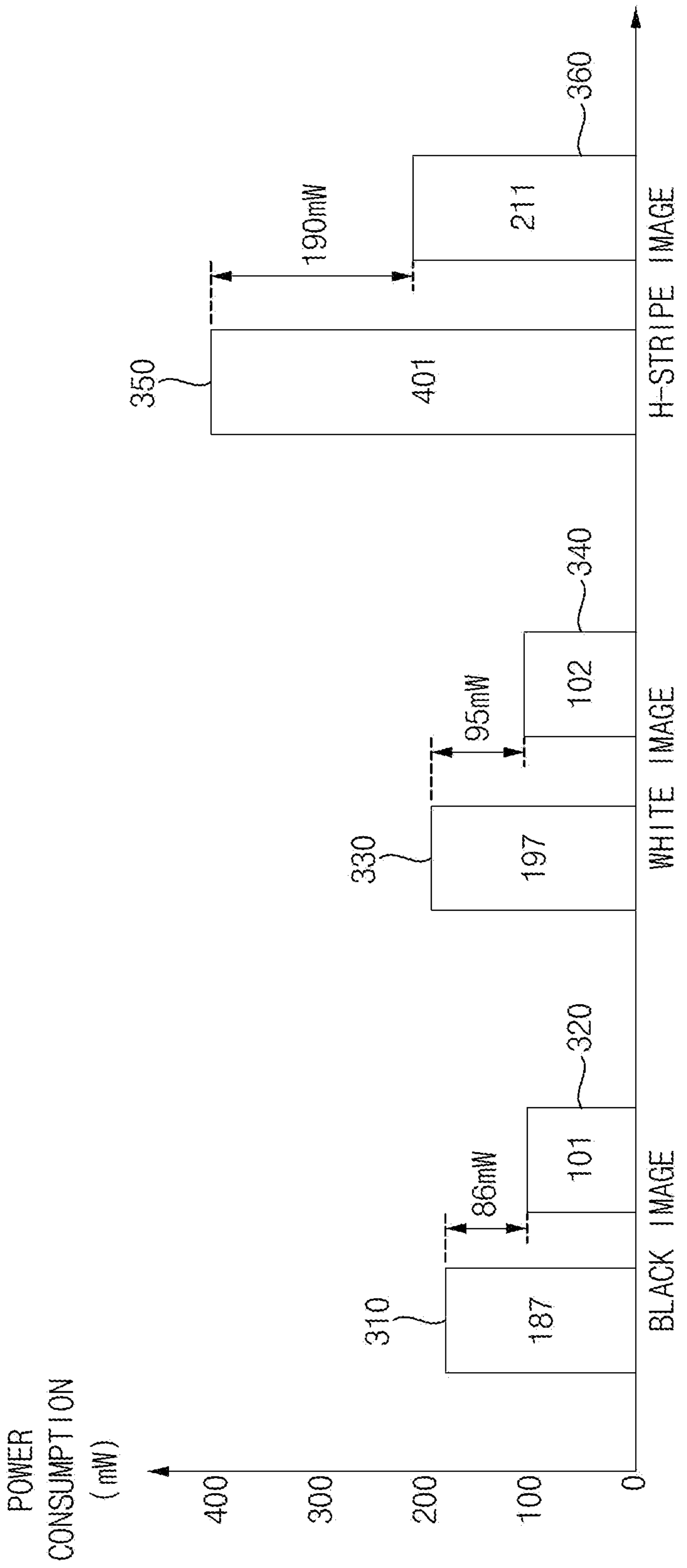
FIG. 6 is a diagram illustrating examples of power consumption when a black image, a white image and a horizontal-stripe (H-stripe) image are displayed in a conventional display device and a display device according to embodiments.

FIG. 1 is a block diagram illustrating a display device according to embodiments, FIG. 2 is a diagram illustrating examples of a reference voltage, a data voltage range and an analog power supply voltage in a conventional display device and a display device according to embodiments, FIG. 3 is a circuit diagram illustrating a portion of a pixel for describing an operation of the pixel in a compensation period, FIG. 4 is a circuit diagram illustrating a portion of a pixel for describing an operation of the pixel in a data writing period, FIG. 5 is a circuit diagram illustrating a portion of a pixel for describing an operation of the pixel in an emission period, and FIG. 6 is a diagram illustrating examples of power consumption when a black image, a white image and a horizontal-stripe (H-stripe) image are displayed in a conventional display device and a display device according to embodiments.

Referring to FIG. 1, a display device 100 according to embodiments may include a display panel 110 that includes a plurality of pixels PX, and a panel driver 120 that drives the display panel 110. In some embodiments, the panel driver 120 may include a data driver 130 that provides data voltages VDAT to the plurality of pixels PX, a scan driver 140 that provides scan signals GI, GC, GW and GB to the plurality of pixels PX, an emission driver 150 that provides emission signals EM to the plurality of pixels PX, a power management circuit 160 that provides voltages AVDD and VREF required for an operation of the display device 100, and a controller 170 that controls the operation of the display device 100. It is to be understood that each of the components of the panel driver 120, i.e., the data driver 130, the scan driver 140, the emission driver 150, the power management circuit 160 and the controller 170 may be implemented in hardware as a circuit.

The display panel 110 may include the plurality of pixels PX arranged in a matrix form having a plurality of rows and a plurality of columns. Each pixel PX may receive a reference voltage VREF and the data voltage VDAT from the panel driver 120, and may emit light with a luminance corresponding to a difference between the reference voltage VREF and the data voltage VDAT as will be described later with reference to FIGS. 3 through 5, and 7 through 20. In other words, each pixel PX receives both a reference voltage VREF and a data voltage VDAT and emits light at a luminance determined by the difference between the two voltages. Thus, although a voltage level of the reference voltage VREF is changed, if the difference between the reference voltage VREF and the data voltage VDAT is substantially constant, each pixel PX may emit light with a substantially constant luminance.

The data driver 130 may provide the data voltages VDAT to the plurality of pixels PX based on a data control signal DCTRL and output image data ODAT received from the controller 170. In some embodiments, the data control signal DCTRL may include, but is not limited to, an output data enable signal, a horizontal start signal, and a load signal. In some embodiments, the data driver 130 and the controller 170 may be implemented as a single integrated circuit, and the single integrated circuit may be referred to as a timing controller embedded data driver (TED) integrated circuit. In other embodiments, the data driver 130 and the controller 170 may be implemented as separate integrated circuits.

The scan driver 140 may sequentially provide the scan signals GI, GC, GW and GB to the plurality of pixels PX on a row-by-row basis based on a scan control signal SCTRL received from the controller 170. In some embodiments, the scan signals GI, GC, GW and GB may include, but are not limited to, initialization signals GI, compensation signals GC, writing signals GW and bypass signals GB. In some embodiments, the scan control signal SCTRL may include, but is not limited to, a scan start signal and a scan clock signal. Further, in some embodiments, the scan driver 140 may be integrated or formed in the display panel 110. In other embodiments, the scan driver 140 may be implemented as one or more integrated circuits.

The emission driver 150 may sequentially provide the emission signals EM to the plurality of pixels PX on a row-by-row basis based on an emission control signal EMCTRL received from the controller 170. In some embodiments, the emission driver 150 may further provide second emission signals EM2 to the plurality of pixels PX. In some embodiments, the emission control signal EMCTRL may include, but is not limited to, an emission start signal and an emission clock signal. Further, in some embodiments, the emission driver 150 may be integrated or formed in the display panel 110. In other embodiments, the emission driver 150 may be implemented as one or more integrated circuits.

The power management circuit 160 may provide an analog power supply voltage AVDD to an analog circuit of the panel driver 120. For example, the power management circuit 160 may provide the analog power supply voltage AVDD to output buffers of the data driver 130. In some embodiments, the power management circuit 160 may further provide a logic power supply voltage to a logic circuit of the panel driver 120. Further, the power management circuit 160 may provide the reference voltage VREF to the plurality of pixels PX of the display panel 110. In some embodiments, the power management circuit 160 may further provide a high power supply voltage, a low power supply voltage, an initialization voltage and an anode initialization voltage to the plurality of pixels PX of the display panel 110. Further, in some embodiments, the power management circuit 160 may be implemented as an integrated circuit, and the integrated circuit may be referred to as a power management integrated circuit (PMIC). In other embodiments, the power management circuit 160 may be implemented within an integrated circuit of the controller 170 and/or the data driver 130.

The controller 170 (e.g., a timing controller (TCON)) may receive input image data IDAT and a control signal CTRL from an external host processor (e.g., a graphics processing unit (GPU), an application processor (AP) or a graphics card). In some embodiments, the control signal CTRL may include, but is not limited to, a vertical synchronization signal, a horizontal synchronization signal, an input data enable signal, and a master clock signal. The controller 170 may generate the output image data ODAT, the data control signal DCTRL, the scan control signal SCTRL and the emission control signal EMCTRL based on the input image data IDAT and the control signal CTRL. The controller 170 may control the data driver 130 by providing the output image data ODAT and the data control signal DCTRL to the data driver 130, may control the scan driver 140 by providing the scan control signal SCTRL to the scan driver 140, and may control the emission driver 150 by providing the emission control signal EMCTRL to the emission driver 150.

In the display device 100 according to embodiments, a voltage level of the reference voltage VREF may be changed, and a range of the data voltage VDAT may be shifted by a voltage level change amount of the reference voltage VREF. In other words, the range of the data voltage VDAT may shift corresponding to the change in the voltage level of the reference voltage VREF. Further, the analog power supply voltage AVDD supplied to the analog circuit (e.g., the output buffers of the data driver 130) of the panel driver 120 may be changed by the voltage level change amount of the reference voltage VREF.

A first graph 210 in FIG. 2 may represent the reference voltage VREF, a data voltage range VDR and the analog power supply voltage AVDD in a conventional display device, and a second graph 230 in FIG. 2 may represent the reference voltage VREF, the data voltage range VDR and the analog power supply voltage AVDD in the display device 100 according to embodiments. In some embodiments, as illustrated in FIG. 2, the voltage level (e.g., about 1.4V) of the reference voltage VREF in the display device 100 according to embodiments may be decreased compared with the voltage level (e.g., about 4.6V) of the reference voltage VREF in the conventional display device. Further, the data voltage range VDR in the display device 100 according to embodiments may be shifted by a voltage level decrease amount VLDA (e.g., about 3.2V, i.e., 3.5V-0.3V) of the reference voltage VREF in a negative direction from the data voltage range VDR in the conventional display device. Thus, a maximum data voltage VDMAX (e.g., about 3.6V) corresponding to a minimum gray level (e.g., a 0-gray level) in the display device 100 according to embodiments may be decreased by the voltage level decrease amount VLDA of 3.2V from the maximum data voltage VDMAX (e.g., about 6.8V) in the conventional display device. In addition, a minimum data voltage VDMIN (e.g., about 0.3V) corresponding to a maximum gray level (e.g., a 255-gray level) in the display device 100 according to embodiments may be decreased by the voltage level decrease amount VLDA of 3.2V from the minimum data voltage VDMIN (e.g., about 3.5V) in the conventional display device. Further, a voltage level (e.g., about 4.3V) of the analog power supply voltage AVDD in the display device 100 according to embodiments may be decreased by the voltage level decrease amount VLDA of 3.2V from the voltage level (e.g., about 7.5V) of the analog power supply voltage AVDD in the conventional display device.

As described above, in the display device 100 according to embodiments, since the reference voltage VREF is decreased, the data voltage range VDR is shifted in the negative direction, and the analog voltage range VDR is decreased compared with those of the conventional display device, power consumption is reduced. In addition, in the display device 100 according to embodiments, even if the reference voltage VREF and the data voltage VDAT applied to each pixel PX change, each pixel PX may emits light with a desired luminance. In other words, the pixel PX of the display device 100 according to embodiments may generate a driving current that corresponds to the difference between the reference voltage VREF and the data voltage VDAT, and may emit light with a luminance corresponding to the driving current. Accordingly, even if the reference voltage VREF and the data voltage VDAT change, the difference between the reference voltage VREF and the data voltage VDAT may be maintained, and the pixel PX may emit light with a substantially constant luminance, or a desired luminance.

For example, as illustrated in FIG. 3, the pixel PX may include a storage capacitor CST including a first electrode connected to a first node N1 and a second electrode connected to a second node N2, a first transistor T1 including a gate connected to the second node N2, a third transistor T3 that diode-connects the first transistor T1, and a light emitting element EL. In a compensation period, the reference voltage VREF may be applied to the first node N1, a power supply voltage ELVDD may be applied to a first terminal (e.g., a source) of the first transistor T1, and the third transistor T3 may diode-connect the first transistor T1. In this case, the first transistor T1 may be turned on until a voltage of the second node N2 becomes a voltage ELVDD−VTH obtained by subtracting a threshold voltage VTH of the first transistor T1 from the power supply voltage ELVDD.

In a data writing period, as illustrated in FIG. 4, the data voltage VDAT may be applied to the first node N1. Thus, a voltage of the first node N1 may be changed from the reference voltage VREF to the data voltage VDAT, or may be changed by a voltage VDAT−VREF obtained by subtracting the reference voltage VREF from the data voltage VDAT. In this case, the voltage of the second node N2, which is in a floating state, may also be changed by the voltage VDAT−VREF, and thus may become "ELVDD−VTH+VDAT−VREF".

In an emission period, as illustrated in FIG. 5, the power supply voltage ELVDD may be applied to the first terminal (e.g., the source) of the first transistor T1. Thus, since the source voltage of the first transistor T1 is "ELVDD" and a gate voltage of the first transistor T1 is "ELVDD−VTH+VDAT−VREF", a source-gate voltage Vsg of the first transistor T1 may be "VREF−VDAT+VTH". Further, a current of a transistor (e.g., a p-type metal oxide semiconductor (PMOS) transistor) may be determined by using an equation "k*(Vsg−VTH)^2"; where k is a constant, or a transconductance parameter of the transistor, Vsg is a source-gate voltage of the transistor, and VTH is a threshold voltage of the transistor. Thus, the first transistor T1 may generate the driving current IDR determined by an equation "IDR=k*(VREF−VDAT)^2", where IDR represents the driving current, k represents a constant (e.g., the transconductance parameter of the first transistor T1), VREF represent the reference voltage, and VDAT represents the data voltage. The light emitting element EL may emit light with a luminance corresponding to the driving current IDR generated by the first transistor T1. In this way, since the amount of the driving current IDR generated by the first transistor T1 is determined based on the difference VREF−VDAT between the reference voltage VREF and the data voltage VDAT, even if the reference voltage VREF is decreased by the voltage level decrease amount VLDA, the first transistor T1 may generate the driving current IDR having substantially the same amount (or roughly the same magnitude) provided the data voltage VDAT also is decreased by the voltage level decrease amount VLDA. Accordingly, the light emitting element EL may emit light with substantially the same luminance.

As described above, in a case where the reference voltage VREF, the data voltage VDAT and the analog power supply voltage AVDD are changed (e.g., decreased), the luminance of each pixel PX may not be changed, and power consumption of the display device 100 may be reduced while a luminance of the display device is not changed. FIG. 6 illustrates examples of power consumption 310, 330 and 350 in the conventional display device and examples of power consumption 320, 340 and 360 in the display device 100 according to embodiments in which the analog power supply voltage AVDD is decreased by about 42.6%. As illustrated in FIG. 6, when displaying a black image, the conventional display device may consume power of about 187 mW, but the display device 100 according to embodiments may consume power of about 101 mW. Thus, the power consumption of about 86 mW may be reduced. Further, when displaying a white image, the conventional display device may consume power of about 197 mW, but the display device 100 according to embodiments may consume power of about 102 mW. Thus, the power consumption of about 95 mW may be reduced. In addition, when displaying a horizontal-stripe (H-stripe) image, the conventional display device may consume power of about 401 mW, but the display device 100 according to embodiments may consume power of about 211 mW. Thus, the power consumption of about 190 mW may be reduced.

As described above, in the display device 100 according to embodiments, each pixel PX may emit light with a luminance corresponding to the difference between the reference voltage VREF and the data voltage VDAT. In addition, the voltage level of the reference voltage VREF may be changed (e.g., decreased), and the range of the data voltage VDAT may be shifted (e.g., in the negative direction) by the voltage level change (or decrease) amount VLDA of the reference voltage VREF. Further, the voltage level of the analog power supply voltage AVDD may be changed (e.g., decreased) by the voltage level change (or decrease) amount VLDA of the reference voltage VREF. Accordingly, the power consumption of the display device 100 may be reduced without changing the luminance of the display device 100. In other words, the display device's 100 power consumption can be decreased without altering its luminance.

Figure 7:
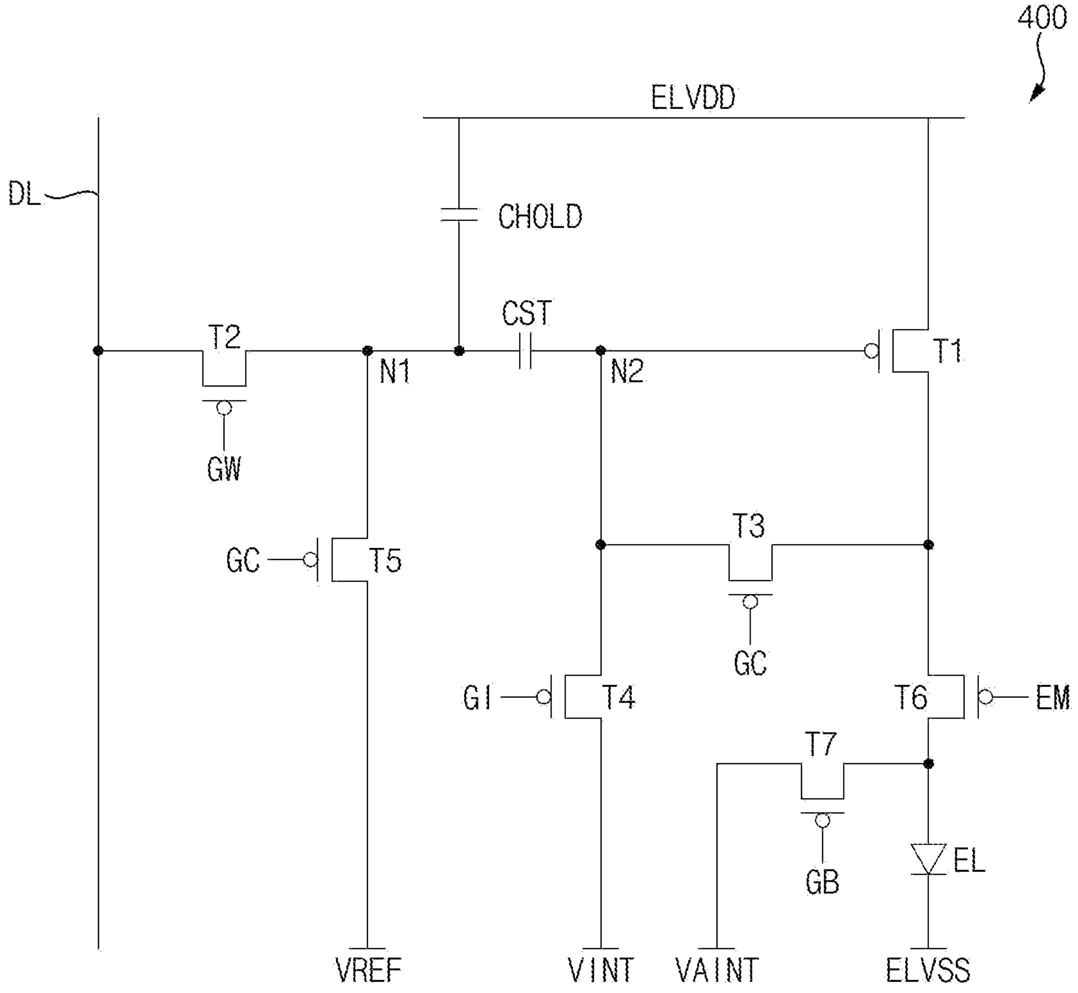
FIG. 7 is a circuit diagram illustrating a pixel included in a display device according to embodiments.
Figure 8:
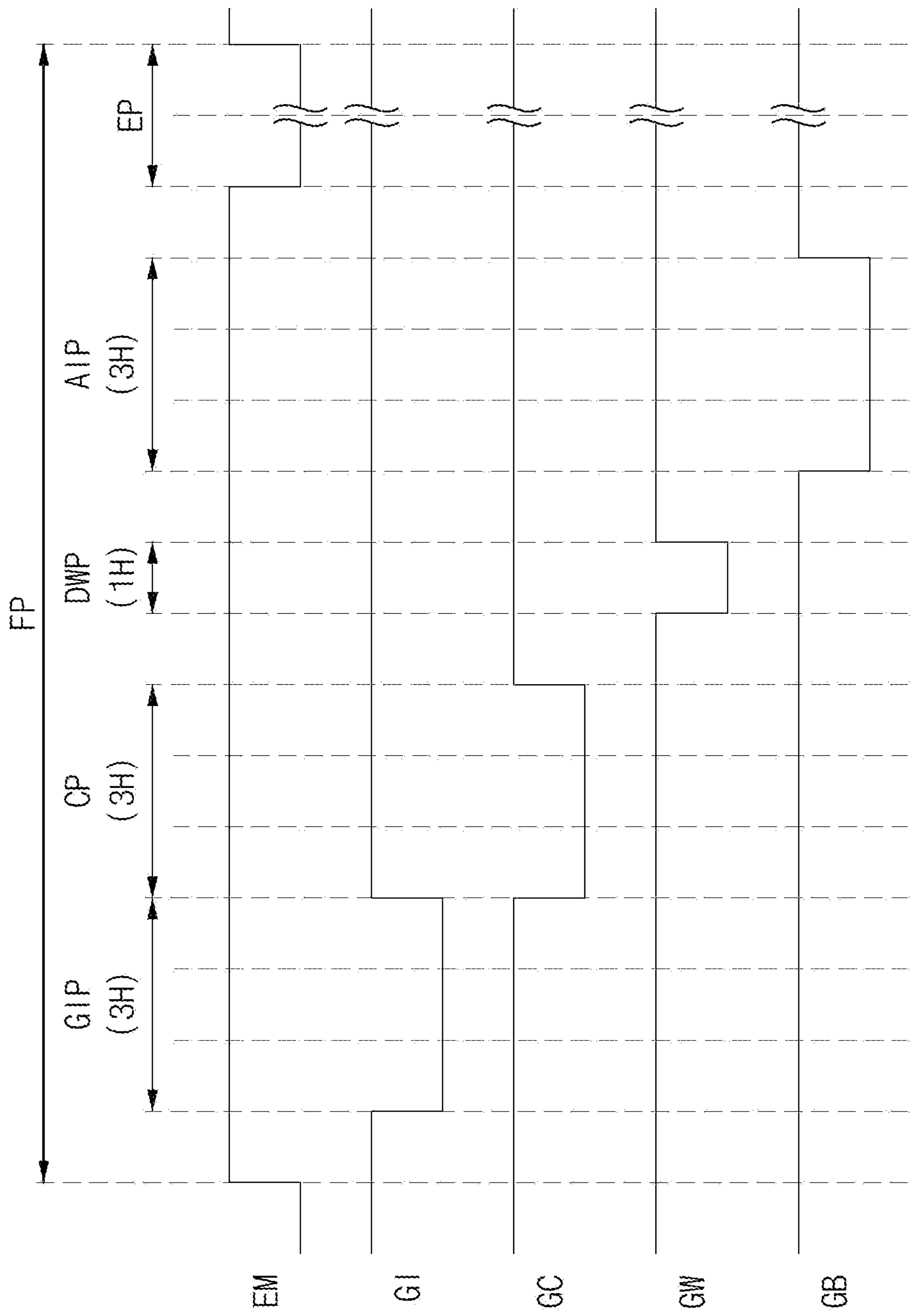
FIG. 8 is a timing diagram for describing an example of an operation of a pixel of FIG. 7.
Figure 9:
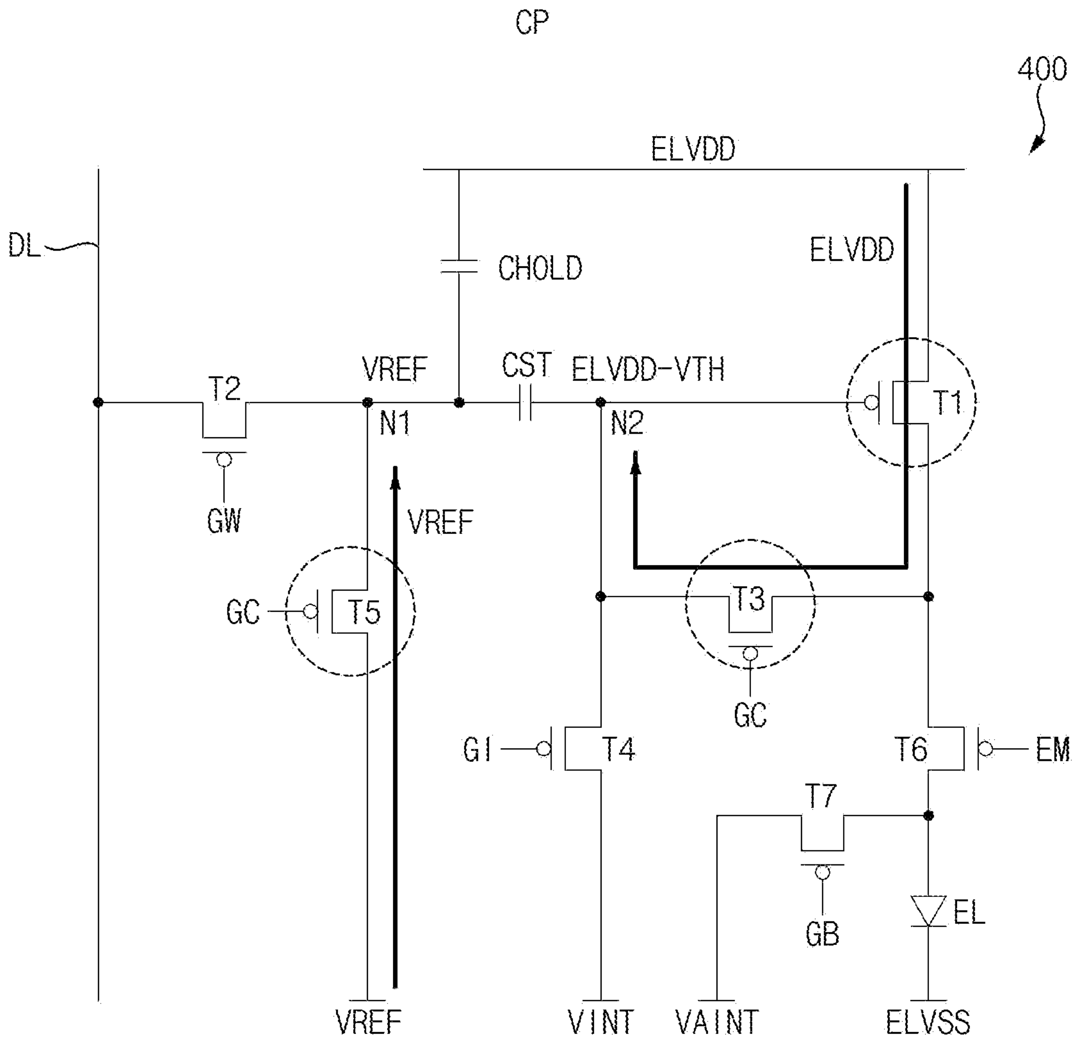
FIG. 9 is a circuit diagram for describing an operation of a pixel of FIG. 7 in a compensation period.
Figure 10:
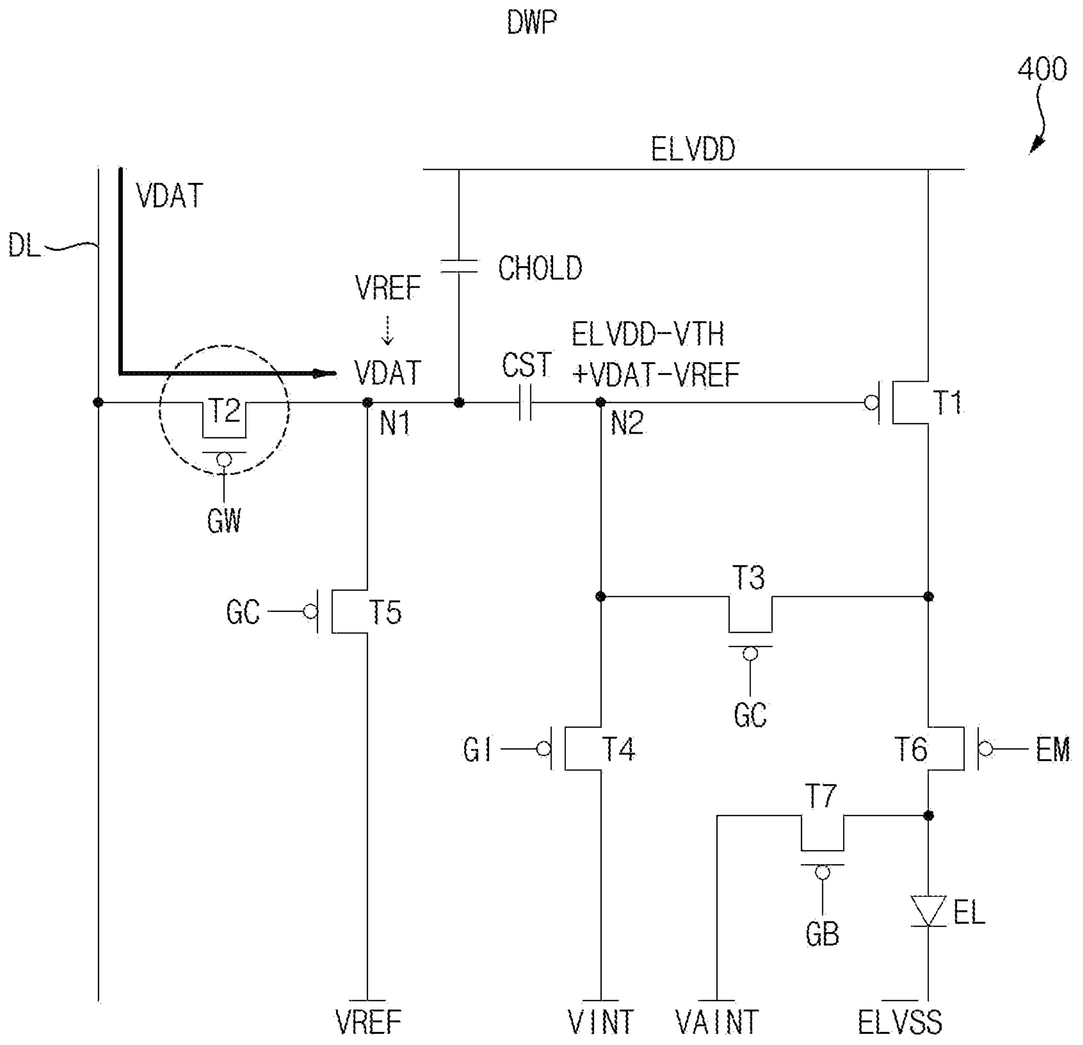
FIG. 10 is a circuit diagram for describing an operation of a pixel of FIG. 7 in a data writing period.
Figure 11:
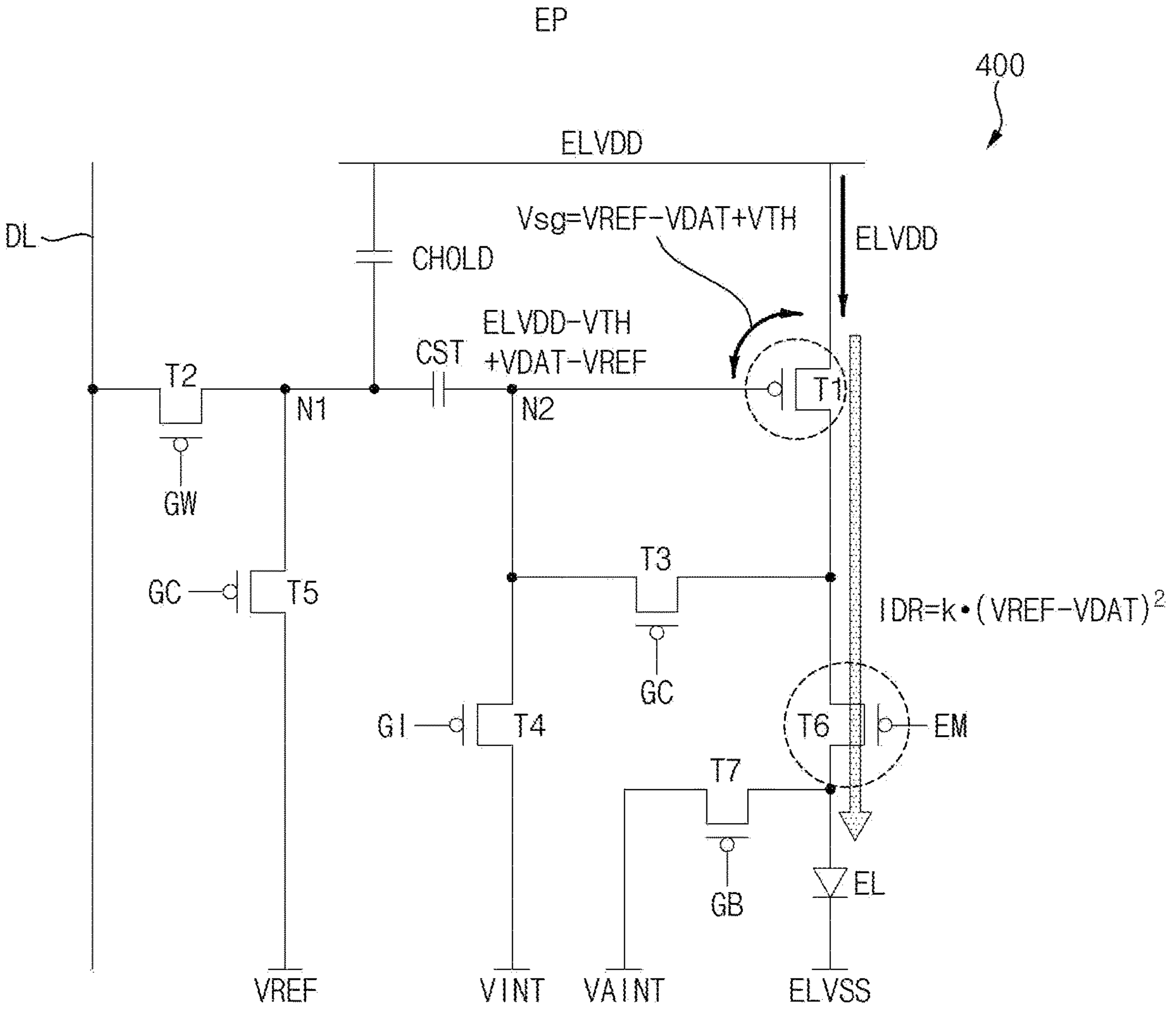
FIG. 11 is a circuit diagram for describing an operation of a pixel of FIG. 7 in an emission period.

FIG. 7 is a circuit diagram illustrating a pixel included in a display device according to embodiments, FIG. 8 is a timing diagram for describing an example of an operation of a pixel of FIG. 7, FIG. 9 is a circuit diagram for describing an operation of a pixel of FIG. 7 in a compensation period, FIG. 10 is a circuit diagram for describing an operation of a pixel of FIG. 7 in a data writing period, and FIG. 11 is a circuit diagram for describing an operation of a pixel of FIG. 7 in an emission period.

Referring to FIG. 7, a pixel 400 of a display device according to embodiments may include a storage capacitor CST, a hold capacitor CHOLD, a first transistor T1, a second transistor T2, a third transistor T3, a fourth transistor T4, a fifth transistor T5, a sixth transistor T6, a seventh transistor T7 and a light emitting element EL.

The storage capacitor CST may be connected between a first node N1 and a second node N2, and may store a data voltage. In some embodiments, the storage capacitor CST may include a first electrode connected to the first node N1 and a second electrode connected to the second node N2.

The hold capacitor CHOLD may be connected between a line for transferring a first power supply voltage ELVDD (e.g., a high power supply voltage) and the first node N1, and may hold a voltage of the first node N1. In some embodiments, the hold capacitor CHOLD may include a first electrode connected to the line for transferring the first power supply voltage ELVDD and a second electrode connected to the first node N1.

The first transistor T1 may generate a driving current. The first transistor T1 may be referred to as a driving transistor that generates the driving current. In some embodiments, the first transistor T1 may include a gate connected to the second node N2, a first terminal (e.g., a source) connected to the line for transferring the first power supply voltage ELVDD, and a second terminal (e.g., a drain) connected to the third and sixth transistors T3 and T6.

The second transistor T2 may transfer the data voltage of a data line DL to the first node N1 in response to a writing signal GW. The second transistor T2 may be referred to as a scan transistor for transferring the data voltage. In some embodiments, the second transistor T2 may include a gate for receiving the writing signal GW, a first terminal connected to the data line DL, and a second terminal connected to the first node N1.

The third transistor T3 may diode-connect the first transistor T1 in response to a compensation signal GC. The third transistor T3 may be referred to as a compensation transistor for compensating a threshold voltage of the first transistor T1. In some embodiments, the third transistor T3 may include a gate for receiving the compensation signal GC, a first terminal connected to the second terminal of the first transistor T1, and a second terminal connected to the second node N2.

The fourth transistor T4 may transfer an initialization voltage VINT to the second node N2 in response to an initialization signal GI. The fourth transistor T4 may be referred to as a gate initialization transistor for initializing the second node N2, or a gate node of the first transistor T1. In some embodiments, the fourth transistor T4 may include a gate for receiving the initialization signal GI, a first terminal connected to the second node N2, and a second terminal connected to a line for transferring the initialization voltage VINT.

The fifth transistor T5 may provide a reference voltage VREF to the first node N1 in response to the compensation signal GC. The fifth transistor T5 may be referred to as a reference transistor for providing the reference voltage VREF. In some embodiments, the fifth transistor T5 may include a gate for receiving the compensation signal GC, a first terminal connected to the first node N1, and a second terminal connected to a line for transferring the reference voltage VREF.

The sixth transistor T6 may provide the driving current generated by the first transistor T1 to the light emitting element EL in response to an emission signal EM. The sixth transistor T6 may be referred to as an emission transistor for enabling the light emitting element EL to emit light. In some embodiments, the sixth transistor T6 may include a gate for receiving the emission signal EM, a first terminal connected to the second terminal of the first transistor T1, and a second terminal connected to an anode of the light emitting element EL.

The seventh transistor T7 may provide an anode initialization voltage VAINT to the anode of the light emitting element EL in response to a bypass signal GB. The seventh transistor T7 may be referred to as an anode initialization transistor for initializing the anode of the light emitting element EL. In some embodiments, as illustrated in FIG. 7, the initialization voltage VINT and the anode initialization voltage VAINT may be different voltages transferred through different lines. In other embodiments, the initialization voltage VINT and the anode initialization voltage VAINT may be the same voltage transferred through the same line. In some embodiments, the seventh transistor T7 may include a gate for receiving the bypass signal GB, a first terminal connected to the anode of the light emitting element EL, and a second terminal connected to a line for transferring the anode initialization voltage AVINT.

The light emitting element EL may emit light based on the driving current generated by the first transistor T1. In some embodiments, the light emitting element EL may be an organic light emitting diode (OLED). In other embodiments, the light emitting element EL may be a nano light emitting diode (NED), a quantum dot (QD) light emitting diode, a micro light emitting diode, an inorganic light emitting diode, or any other suitable light emitting element. In some embodiments, the light emitting element EL may include the anode connected to the sixth and seventh transistors T6 and T7, and a cathode connected to a line for transferring a second power supply voltage ELVSS (e.g., a low power supply voltage).

Hereinafter, an operation of the pixel 400 of the display device according to embodiments will be described below with reference to FIGS. 7 through 11.

Referring to FIGS. 7 and 8, a frame period FP for the pixel 400 may include a gate initialization period GIP, a compensation period CP, a data writing period DWP, an anode initialization period AIP and an emission period EP.

In the gate initialization period GIP, the initialization signal GI may have an on level (e.g., a low level), and the fourth transistor T4 may be turned on in response to the initialization signal GI having the on level. Thus, the fourth transistor T4 may apply the initialization voltage VINT to the second node N2, and thus the second node N2, or the gate node of the first transistor T1 may be initialized. In some embodiments, a time length of the gate initialization interval GIP may correspond to, but is not limited to, three horizontal (3H) times. Here, one horizontal (1H) time may be a time allocated to each pixel row of a display panel, e.g., the display panel 110 of FIG. 1.

In the compensation period CP, the compensation signal GC may have the on level. In other words, the compensation signal GC may have the low level in the compensation period CP. As illustrated in FIG. 9, the third and fifth transistors T3 and T5 may be turned on in response to the compensation signal GC having the on level. Thus, the fifth transistor T5 may apply the reference voltage VREF to the first node N1. Further, the third transistor T3 may diode-connect the first transistor T1. Accordingly, a voltage ELVDD−VTH obtained by subtracting the threshold voltage VTH of the first transistor T1 from the first power supply voltage ELVDD may be transferred to the second node N2 through the diode-connected first transistor T1. In some embodiments, as illustrated in FIG. 8, the compensation period CP and the data writing period DWP may be separated from each other (e.g., by 1H time), and the compensation period CP may have a time length (e.g., 3H time) longer than a time length (e.g., 1H time) of the data writing period DWP. Accordingly, the threshold voltage VTH of the first driving transistor T1 may be sufficiently compensated. This driving method may be referred to as a separated compensation driving (SCD) method.

In the data writing period DWP, the writing signal GW may have the on level. In other words, the writing signal GW may have the low level in the data writing period DWP. As illustrated in FIG. 10, the second transistor T2 may be turned on in response to the writing signal GW having the on level. Thus, the second transistor T2 may apply the data voltage VDAT to the first node N1. Accordingly, the voltage of the first node N1, or the voltage of the first electrode of the storage capacitor CST may be changed from the reference voltage VREF to the data voltage VDAT by the difference (or "VDAT−VREF") between the data voltage VDAT and the reference voltage VREF. If the voltage of the first electrode of the storage capacitor CST is changed by the difference between the data voltage VDAT and the reference voltage VREF, a voltage of the second electrode of the storage capacitor CST, which is in a floating state, may also be changed by the difference between the data voltage VDAT and the reference voltage VREF. Accordingly, the voltage of the second node N2, or the voltage of the second electrode of the storage capacitor CST may become "ELVDD−VTH+VDAT−VREF".

In the anode initialization period AIP, which may be 1H time after the data writing period DWP, the bypass signal GB may have the on level, and the seventh transistor T7 may be turned on in response to the bypass signal GB having the on level. Thus, the seventh transistor T7 may apply the anode initialization voltage VAINT to the anode of the light emitting element EL, and thus the anode of the light emitting element EL may be initialized. In some embodiments, a time length of the anode initialization interval AIP may correspond to, but is not limited to, three horizontal (3H) times.

In the emission period EP, the emission signal EM may have the on level. As illustrated in FIG. 11, sine the first power supply voltage ELVDD is applied to the source of the first transistor T1, and the gate voltage of the first transistor T1 is "ELVDD−VTH+VDAT−VREF", the source-gate voltage Vsg of the first transistor T1 may be "VREF−VDAT+VTH". The first transistor T1 may generate the driving current IDR determined by the equation "IDR=k*(VREF−VDAT)^2", where IDR represents the driving current, k represents a constant (e.g., a transconductance parameter of the first transistor T1), VREF represents the reference voltage, and VDAT represents the data voltage. The light emitting element EL may emit light with a luminance corresponding to the driving current IDR generated by the first transistor T1. Since an amount of the driving current IDR generated by the first transistor T1 is determined based on the difference VREF−VDAT between the reference voltage VREF and the data voltage VDAT, even if the reference voltage VREF changes, the first transistor T1 may generate the driving current IDR having substantially the same amount provided the data voltage VDAT also is decreased by the same voltage level change as the reference voltage VREF. Consequently, the light emitting element EL may emit light with substantially the same luminance.

Figure 12:
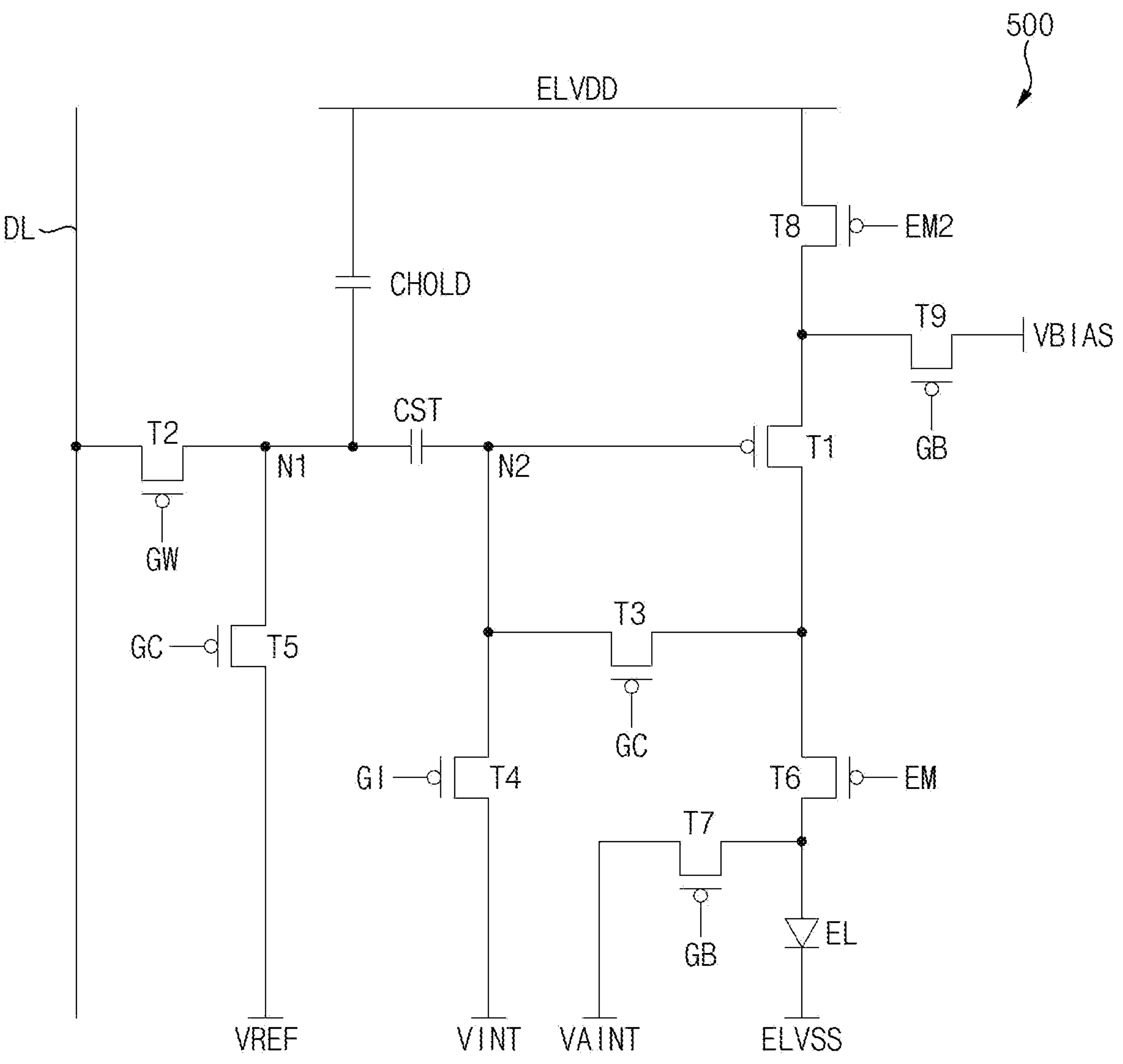
FIG. 12 is a circuit diagram illustrating a pixel included in a display device according to embodiments.
Figure 13:
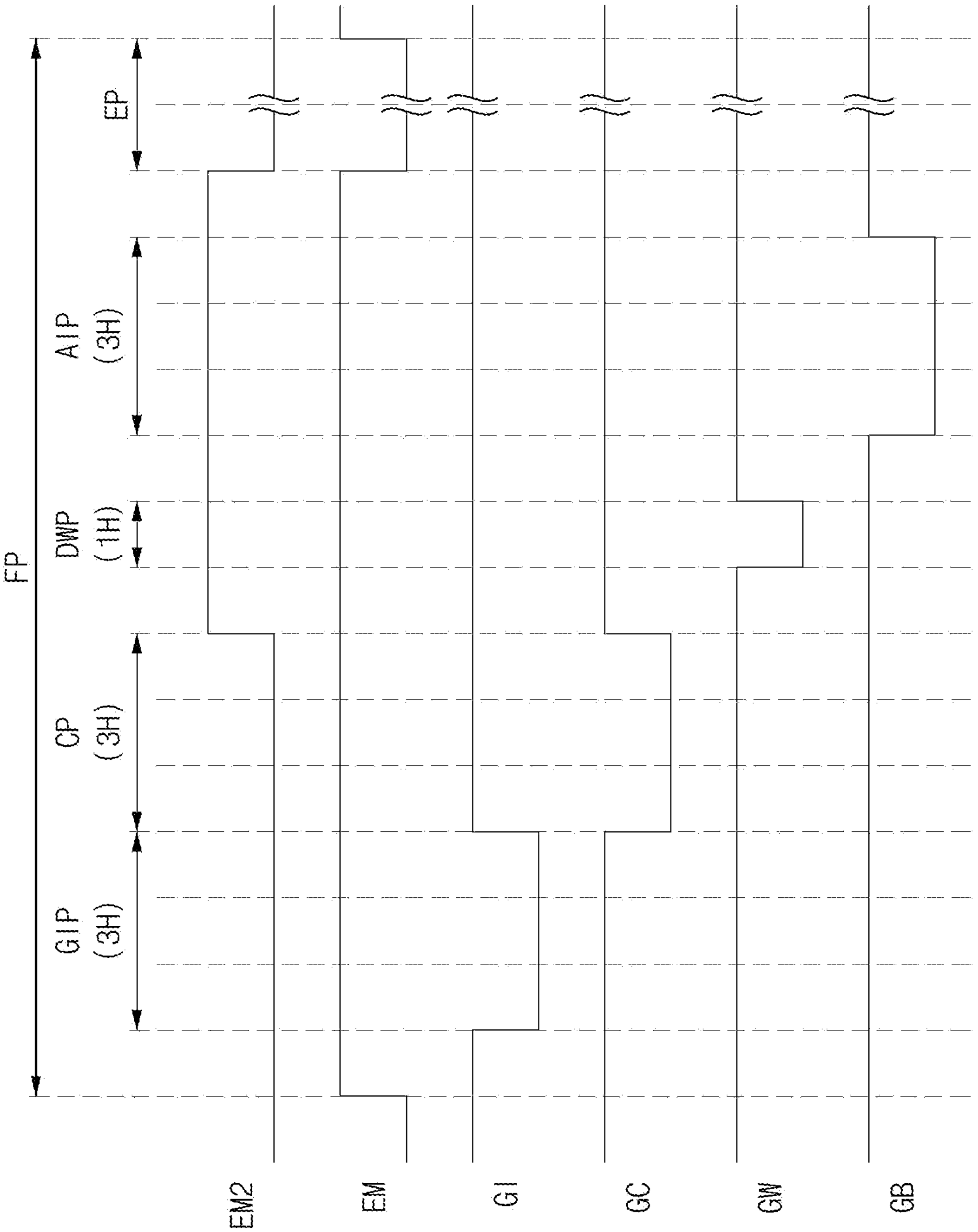
FIG. 13 is a timing diagram for describing an example of an operation of a pixel of FIG. 12.
Figure 14:
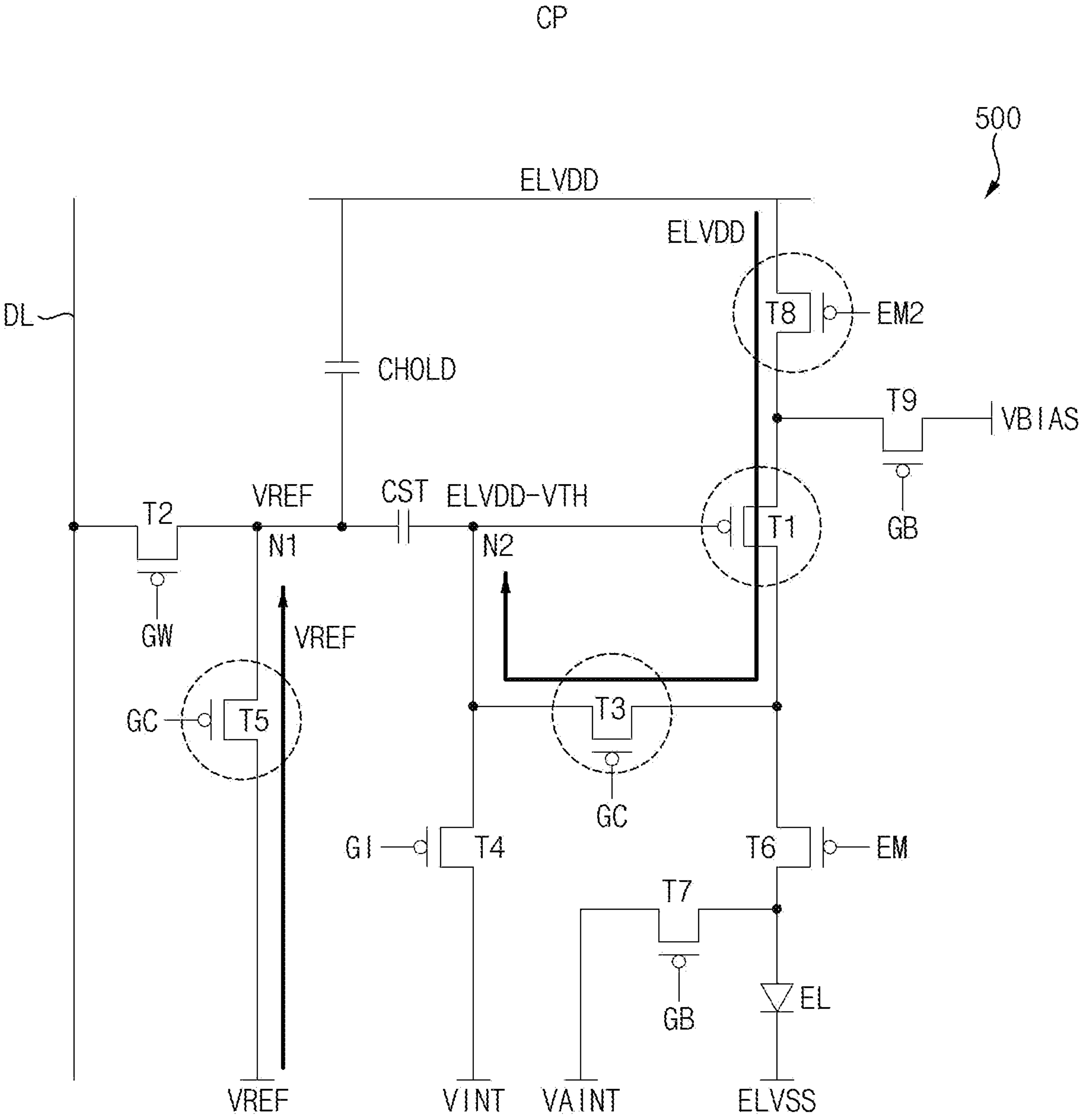
FIG. 14 is a circuit diagram for describing an operation of a pixel of FIG. 12 in a compensation period.
Figure 15:
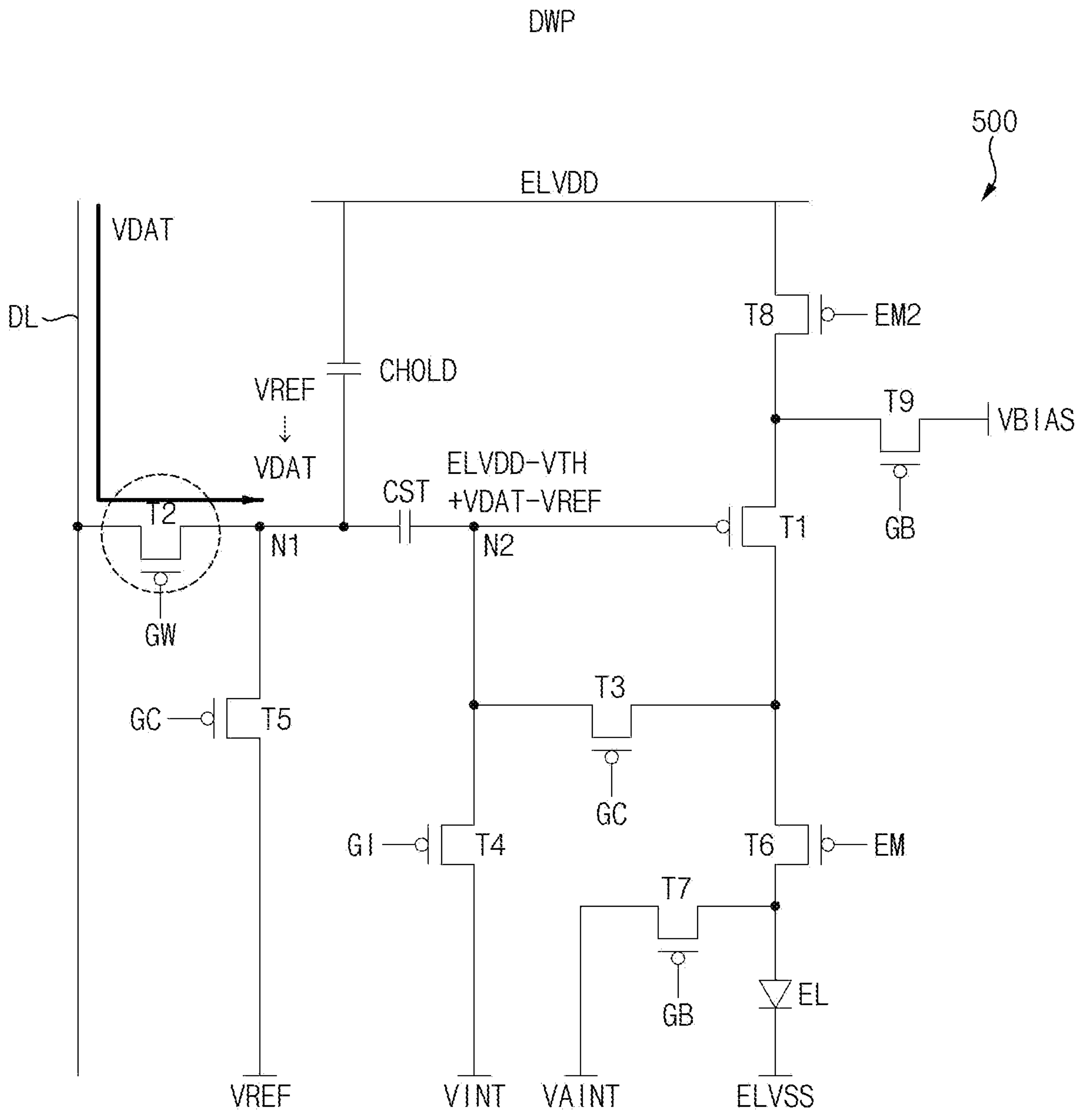
FIG. 15 is a circuit diagram for describing an operation of a pixel of FIG. 12 in a data writing period.
Figure 16:
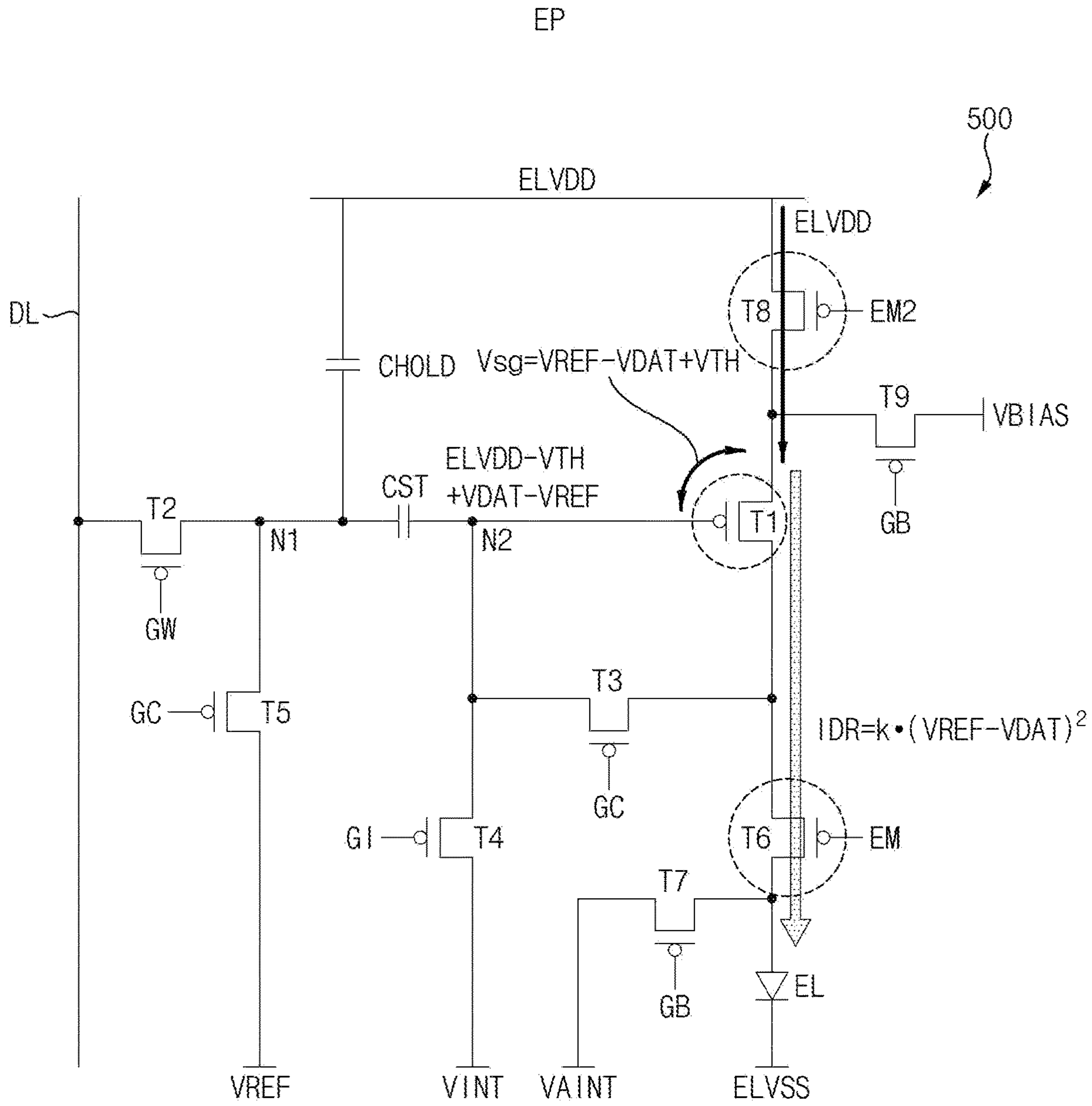
FIG. 16 is a circuit diagram for describing an operation of a pixel of FIG. 12 in an emission period.

FIG. 12 is a circuit diagram illustrating a pixel included in a display device according to embodiments, FIG. 13 is a timing diagram for describing an example of an operation of a pixel of FIG. 12, FIG. 14 is a circuit diagram for describing an operation of a pixel of FIG. 12 in a compensation period, FIG. 15 is a circuit diagram for describing an operation of a pixel of FIG. 12 in a data writing period, and FIG. 16 is a circuit diagram for describing an operation of a pixel of FIG. 12 in an emission period.

Referring to FIG. 12, a pixel 500 of a display device according to embodiments may include a storage capacitor CST, a hold capacitor CHOLD, a first transistor T1, a second transistor T2, a third transistor T3, a fourth transistor T4, a fifth transistor T5, a sixth transistor T6, a seventh transistor T7, an eighth transistor T8, a ninth transistor T9 and a light emitting element EL. The pixel 500 of FIG. 12 may have substantially the same configuration as the pixel 400 of FIG. 7, except that the pixel 500 may further include the eighth transistor T8 and the ninth transistor T9.

The eighth transistor T8 may selectively connect the line for transferring the first power supply voltage ELVDD to the first terminal (e.g., the source) of the first transistor T1 in response to a second emission signal EM2. In some embodiments, the eighth transistor T8 may include a gate for receiving the second emission signal EM2, a first terminal connected to the line for transferring the first power supply voltage ELVDD, and a second terminal connected to the first terminal of the first transistor T1.

The ninth transistor T9 may provide a bias voltage VBIAS to the first terminal of the first transistor T1 in response to the bypass signal GB. In some embodiments, the ninth transistor T9 may include a gate for receiving the bypass signal GB, a first terminal connected to a line for transferring the bias voltage VBIAS, and a second terminal connected to the first terminal of the first transistor T1.

Hereinafter, an operation of the pixel 500 of the display device according to embodiments will be described below with reference to FIGS. 12 through 16.

Referring to FIGS. 12 and 13, a frame period FP for the pixel 500 may include a gate initialization period GIP, a compensation period CP, a data writing period DWP, an anode initialization period AIP and an emission period EP. A timing diagram of FIG. 13 may be substantially the same as the timing diagram of FIG. 8, except that the second emission signal EM2 may have an on level (e.g., a low level) in the gate initialization period GIP, the compensation period CP and the emission period EP.

In the compensation period CP, the compensation signal GC may have the on level, and the second emission signal EM2 may have the on level. As illustrated in FIG. 14, the third and fifth transistors T3 and T5 may be turned on in response to the compensation signal GC having the on level. Thus, the fifth transistor T5 may apply the reference voltage VREF to the first node N1. Further, the eighth transistor T8 may apply the first power supply voltage ELVDD to the source of the first transistor T1, and the third transistor T3 may diode-connect the first transistor T1. Accordingly, a voltage ELVDD−VTH obtained by subtracting the threshold voltage VTH of the first transistor T1 from the first power supply voltage ELVDD may be transferred to the second node N2 through the diode-connected first transistor T1.

In the data writing period DWP, the writing signal GW may have the on level. As illustrated in FIG. 15, the second transistor T2 may be turned on in response to the writing signal GW having the on level. Thus, the second transistor T2 may apply the data voltage VDAT to the first node N1. Thus, a voltage of the second node N2 may become “ELVDD−VTH+VDAT−VREF”.

In the anode initialization period AIP, the bypass signal GB may have the on level. The seventh transistor T7 may be turned on in response to the bypass signal GB having the on level. Thus, the seventh transistor T7 may apply the anode initialization voltage VAINT to an anode of the light emitting element EL, and thus the anode of the light emitting element EL may be initialized. Further, the ninth transistor T9 may be turned on in response to the bypass signal GB having the on level. Thus, the ninth transistor T9 may apply the bias voltage VBIAS to the first transistor T1, and thus a hysteresis of the first transistor T1 may be removed.

In the emission period EP, the emission signal EM and the second emission signal EM2 may have the on level. As illustrated in FIG. 16, since the eighth transistor T8 applies the first power supply voltage ELVDD to the source of the first transistor T1, and a gate voltage of the first transistor T1 is “ELVDD−VTH+VDAT−VREF”, a source-gate voltage Vsg of the first transistor T1 may be “VREF−VDAT+VTH”. The first transistor T1 may generate a driving current IDR determined by an equation “IDR=k*(VREF−VDAT)^2”. The light emitting element EL may emit light with a luminance corresponding to the driving current IDR generated by the first transistor T1. Accordingly, even if a voltage level of the reference voltage VREF is changed, the first transistor T1 may generate the driving current IDR having substantially the same amount provided the data voltage VDAT is also decreased by the same voltage level change as the reference voltage VREF. Consequently, and the light emitting element EL may emit light with substantially the same luminance.

Figure 17:
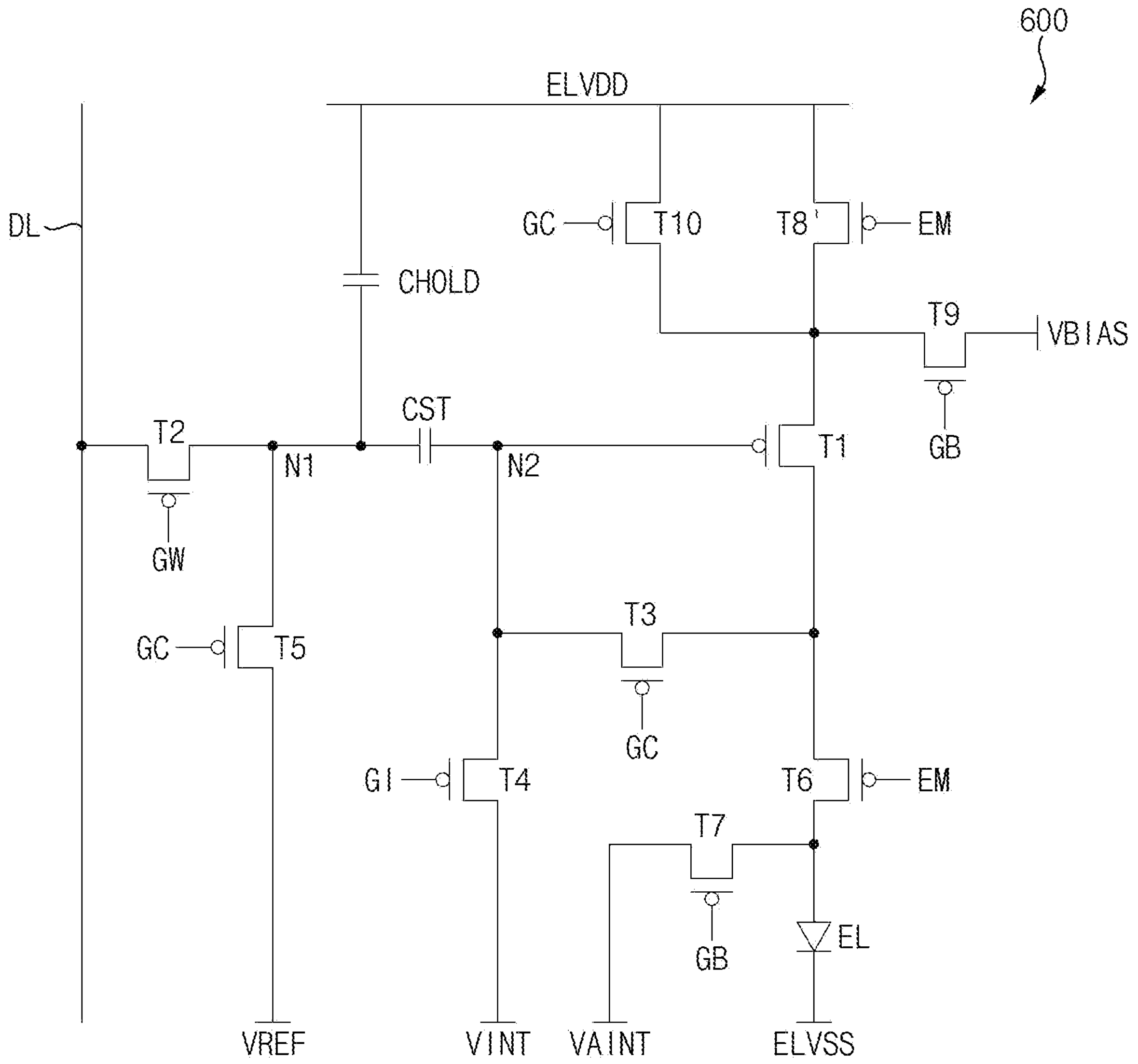
FIG. 17 is a circuit diagram illustrating a pixel included in a display device according to embodiments.
Figure 18:
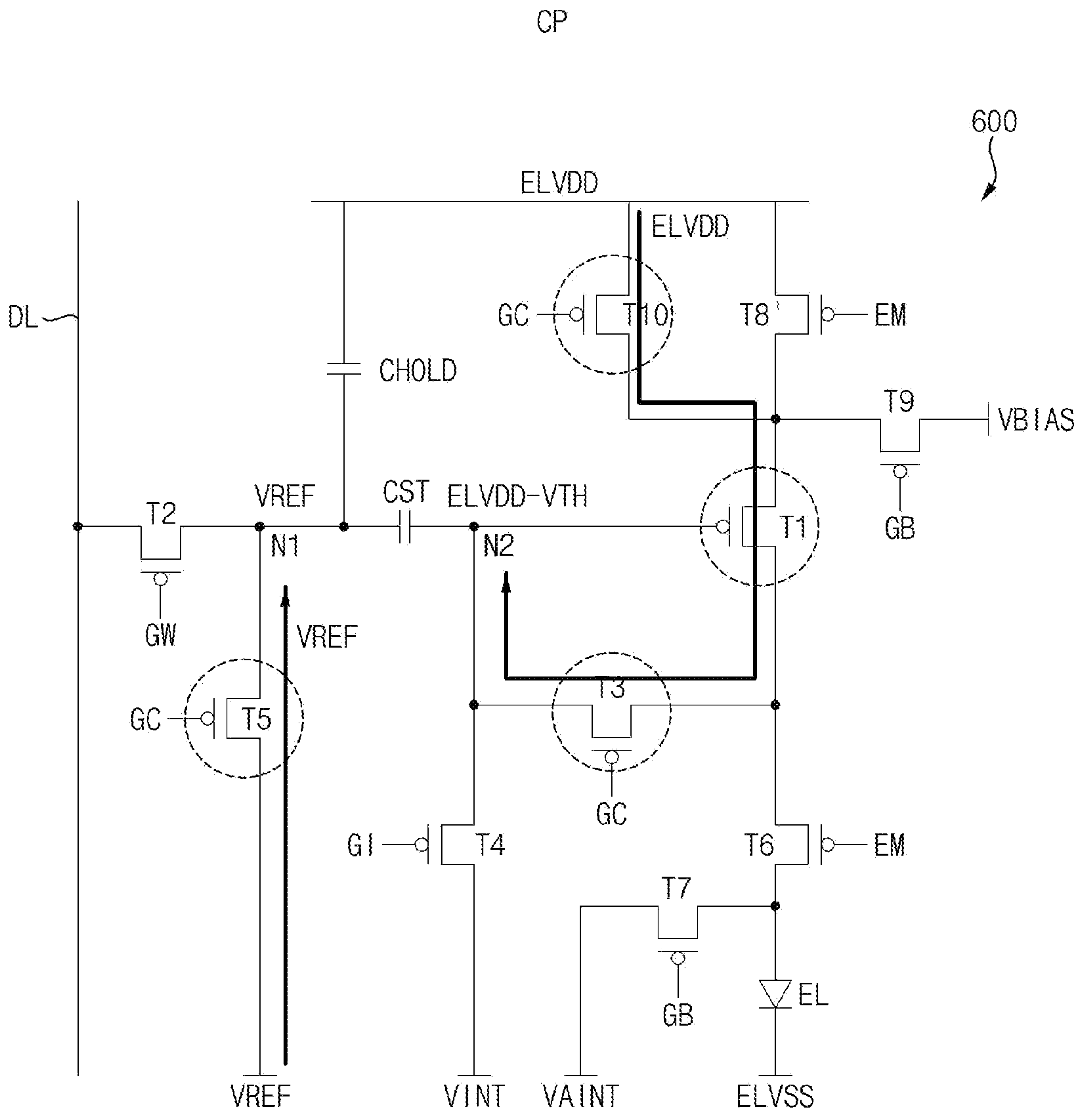
FIG. 18 is a circuit diagram for describing an operation of a pixel of FIG. 17 in a compensation period.
Figure 19:
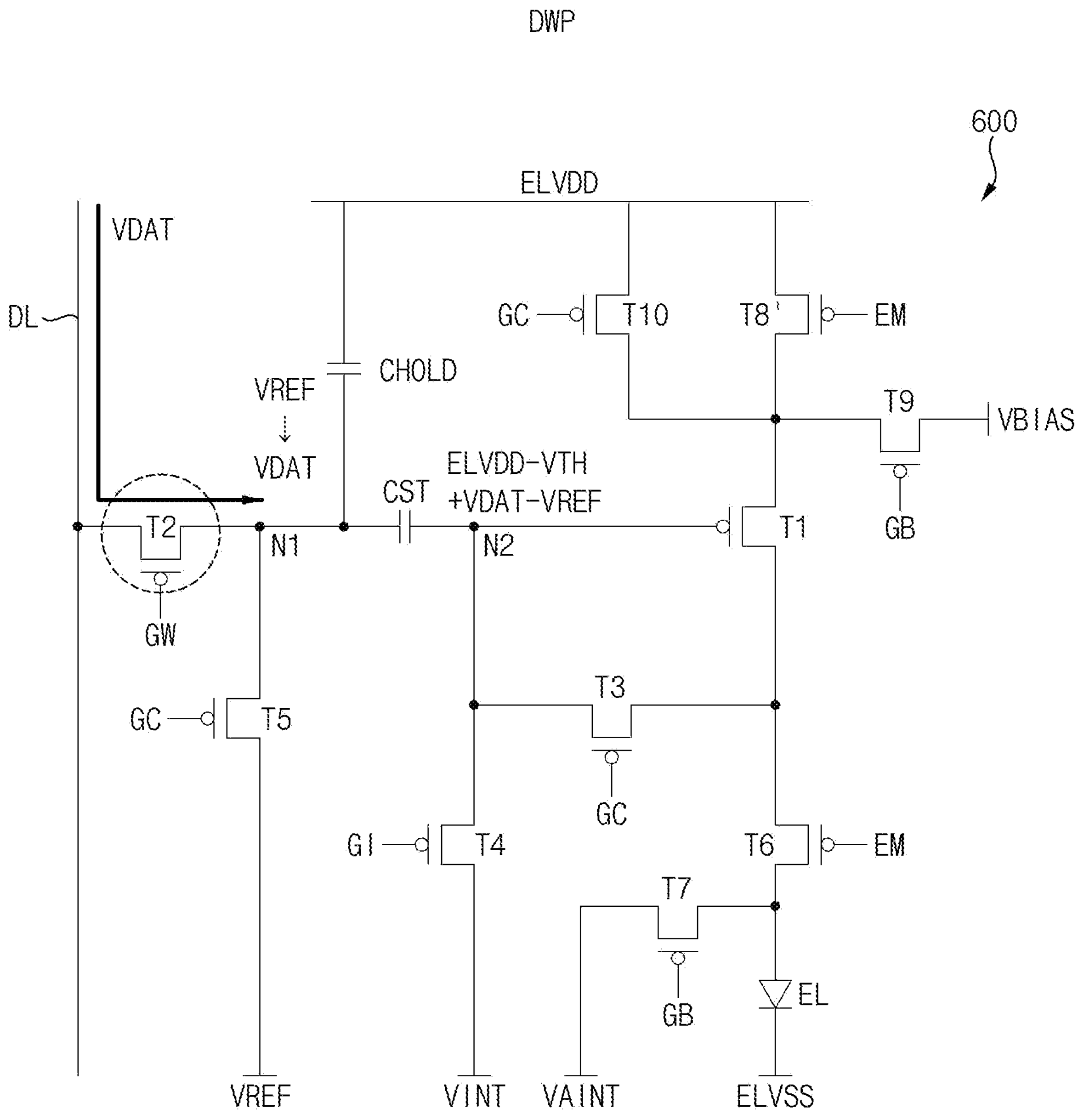
FIG. 19 is a circuit diagram for describing an operation of a pixel of FIG. 17 in a data writing period.
Figure 20:
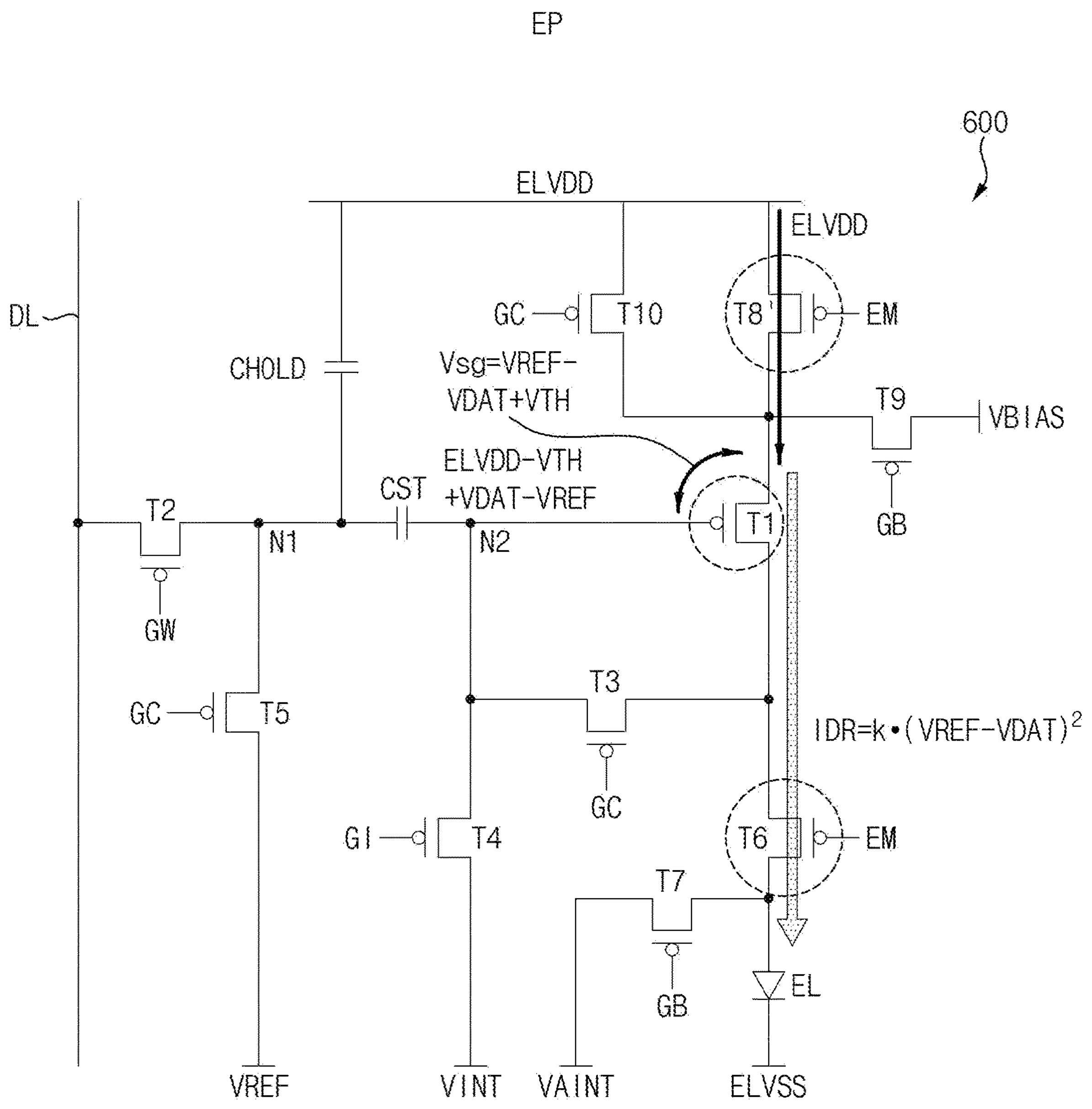
FIG. 20 is a circuit diagram for describing an operation of a pixel of FIG. 17 in an emission period.

FIG. 17 is a circuit diagram illustrating a pixel included in a display device according to embodiments, FIG. 18 is a circuit diagram for describing an operation of a pixel of FIG. 17 in a compensation period, FIG. 19 is a circuit diagram for describing an operation of a pixel of FIG. 17 in a data writing period, and FIG. 20 is a circuit diagram for describing an operation of a pixel of FIG. 17 in an emission period.

Referring to FIG. 17, a pixel 600 of a display device according to embodiments may include a storage capacitor CST, a hold capacitor CHOLD, a first transistor T1, a second transistor T2, a third transistor T3, a fourth transistor T4, a fifth transistor T5, a sixth transistor T6, a seventh transistor T7, an eighth transistor T8', a ninth transistor T9, a tenth transistor T10 and a light emitting element EL. The pixel 600 of FIG. 17 may have substantially the same configuration as the pixel 400 of FIG. 7, except that the pixel 600 may further include the eighth transistor T8', the ninth transistor T9 and the tenth transistor T10.

The eighth transistor T8' may selectively connect the line for transferring the first power supply voltage ELVDD to the first terminal (e.g., the source) of the first transistor T1 in response to the emission signal EM. In some embodiments, the eighth transistor T8' may include a gate for receiving the emission signal EM, a first terminal connected to the line for transferring the first power supply voltage ELVDD, and a second terminal connected to the first terminal of the first transistor T1.

The ninth transistor T9 may provide the bias voltage VBIAS to the first terminal of the first transistor T1 in response to the bypass signal GB. In some embodiments, the ninth transistor T9 may include a gate for receiving the bypass signal GB, a first terminal connected to the line for transferring the bias voltage VBIAS, and a second terminal connected to the first terminal of the first transistor T1.

The tenth transistor T10 may selectively connect the line for transferring the first power supply voltage ELVDD to the first terminal of the first transistor T1 in response to the compensation signal GC. In some embodiments, the tenth transistor T10 may include a gate for receiving the compensation signal GC, a first terminal connected to the line for transferring the first power supply voltage ELVDD, and a second terminal connected to the first terminal of the first transistor T1.

Hereinafter, an operation of the pixel 600 of the display device according to embodiments will be described below with reference to FIGS. 17 through 20. The emission signal EM, the initialization signal GI, the compensation signal GC, the writing signal GW and the bypass signal GB illustrated in FIG. 8 may be applied to the pixel 600.

In the compensation period CP, the compensation signal GC may have an on level. As illustrated in FIG. 18, the third, fifth and tenth transistors T3, T5 and T10 may be turned on in response to the compensation signal GC having the on level. Thus, the fifth transistor T5 may apply the reference voltage VREF to the first node N1. Further, the tenth transistor T10 may apply the first power supply voltage ELVDD to the source of the first transistor T1, and the third transistor T3 may diode-connect the first transistor T1. Accordingly, a voltage ELVDD−VTH obtained by subtracting the threshold voltage VTH of the first transistor T1 from the first power supply voltage ELVDD may be transferred to the second node N2 through the diode-connected first transistor T1.

In the data writing period DWP, the writing signal GW may have the on level. As illustrated in FIG. 19, the second transistor T2 may be turned on in response to the writing signal GW having the on level. Thus, the second transistor T2 may apply the data voltage VDAT to the first node N1. Thus, a voltage of the second node N2 may become “ELVDD−VTH+VDAT−VREF”.

In the emission period EP, the emission signal EM may have the on level. As illustrated in FIG. 20, since the eighth transistor T8' applies the first power supply voltage ELVDD to the source of the first transistor T1, and a gate voltage of the first transistor T1 is “ELVDD−VTH+VDAT−VREF”, a source-gate voltage Vsg of the first transistor T1 may be “VREF−VDAT+VTH”. The first transistor T1 may generate a driving current IDR determined by an equation “IDR=k*(VREF−VDAT)^2”. The light emitting element EL may emit light with a luminance corresponding to the driving current IDR generated by the first transistor T1. Accordingly, even if a voltage level of the reference voltage VREF is changed, the first transistor T1 may generate the driving current IDR having substantially the same amount provided the data voltage VDAT is also decreased by the same voltage level change of the reference voltage VREF. Consequently, the light emitting element EL may emit light with substantially the same luminance.

Figure 21:
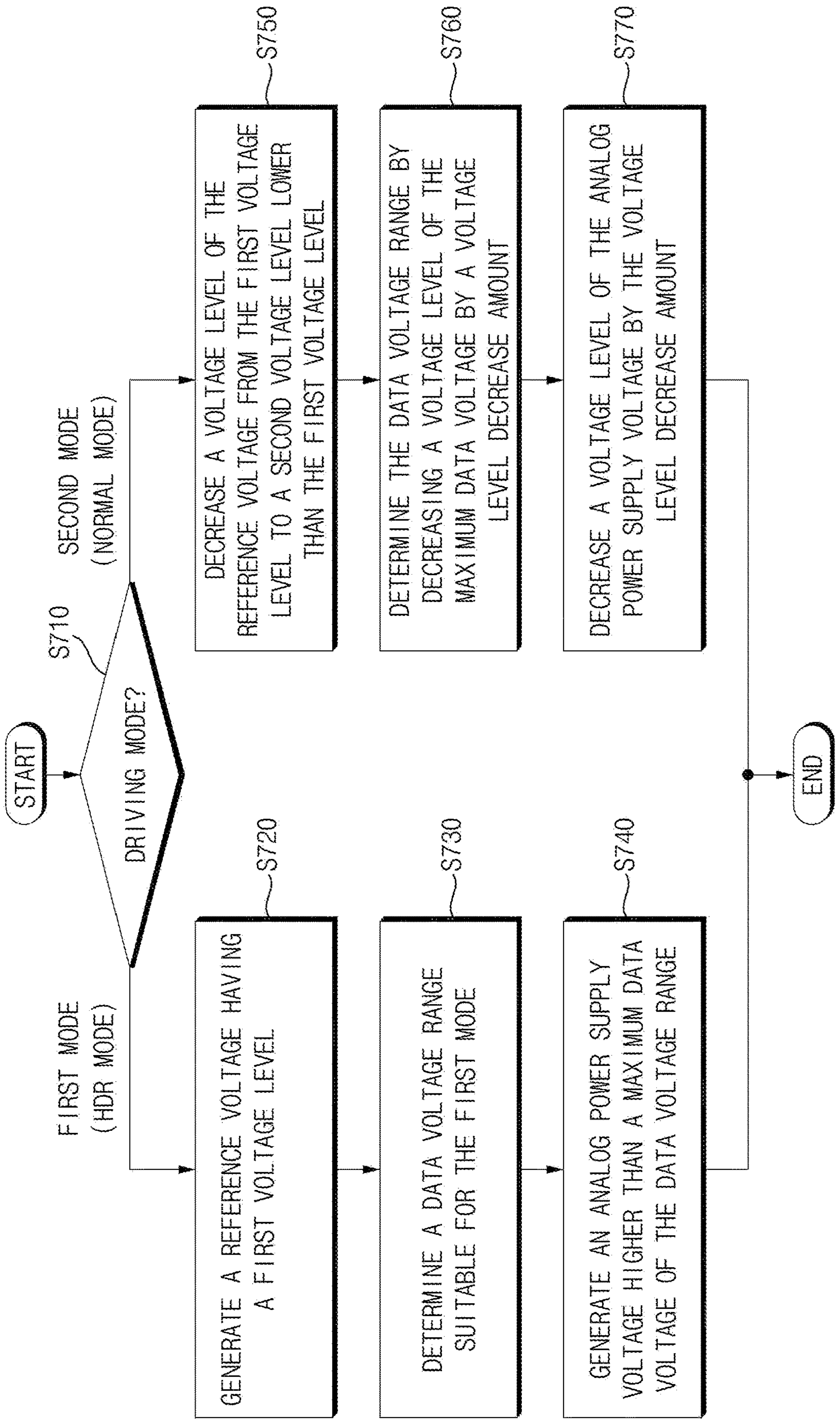
FIG. 21 is a flowchart for describing an operation of a display device according to embodiments.
Figure 22:
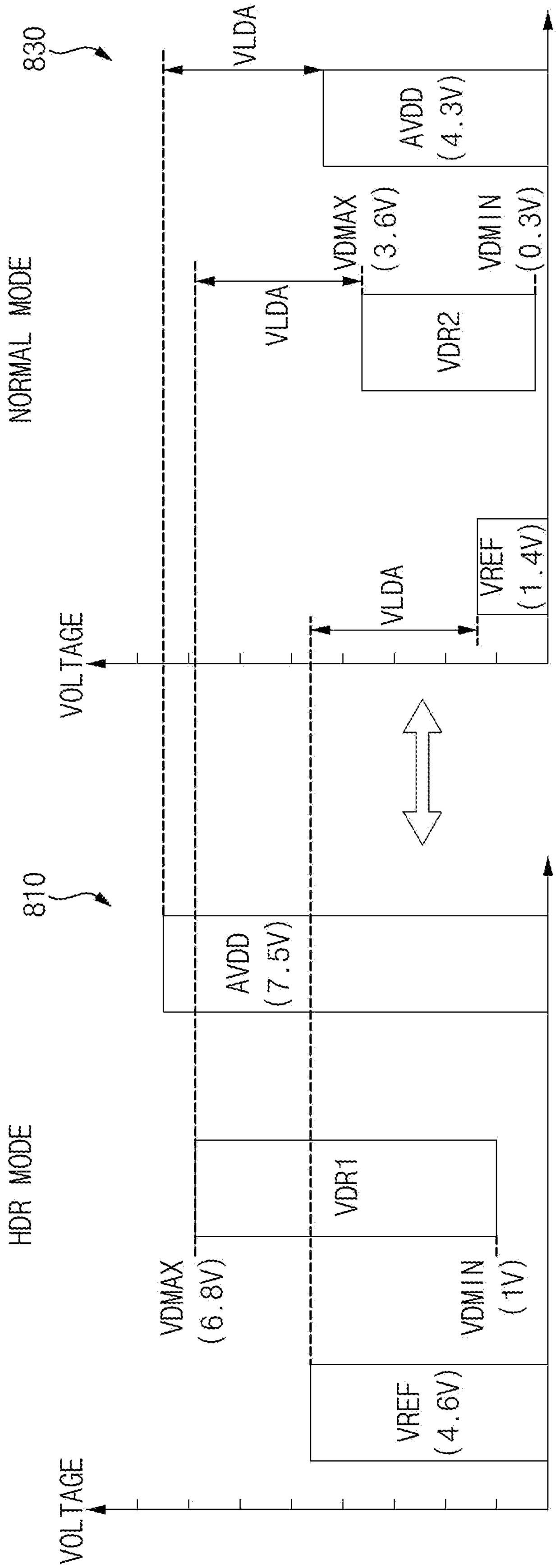
FIG. 22 is a diagram illustrating examples of a reference voltage, a data voltage range and an analog power supply voltage in a first mode and a second mode of a display device according to embodiments.

FIG. 21 is a flowchart for describing an operation of a display device according to embodiments, and FIG. 22 is a diagram illustrating examples of a reference voltage, a data voltage range and an analog power supply voltage in a first mode and a second mode of a display device according to embodiments.

Referring to FIGS. 1 and 21, in the display device 100 according to embodiments, a reference voltage VREF, a range of a data voltage VDAT and an analog power supply voltage AVDD in a second mode may be different from the reference voltage VREF, the range of the data voltage VDAT and the analog power supply voltage AVDD in a first mode, respectively. In some embodiments, the first mode may be, but is not limited to, a high dynamic range (HDR) mode, and the second mode may be, but is not limited to, a normal mode.

In a case where a driving mode of the display device 100 is the first mode (e.g., the HDR mode) (S710: FIRST MODE), the panel driver 120 may generate a reference voltage VREF having a first voltage level (S720). Further, the panel driver 120 may determine a data voltage range suitable for the first mode, and provide a pixel PX with the data voltage VDAT within the data voltage range (S730). In addition, the panel driver 120 may generate the analog power supply voltage AVDD that is higher than a maximum data voltage of the data voltage range corresponding to a minimum gray level (S740).

Alternatively, in a case where the driving mode of the display device 100 is the second mode (e.g., the normal mode) (S710: SECOND MODE), the panel driver 120 may generate the reference voltage VREF having a second voltage level different from the first voltage level, may change the data voltage range, and may change a voltage level of the analog power supply voltage AVDD. In other words, the second voltage level of the reference voltage VREF in the second mode may be different from the first voltage level of the reference voltage VREF in the first mode, a voltage level of the maximum data voltage corresponding to the minimum gray level in the second mode may be different from the voltage level of the maximum data voltage in the first mode, and the voltage level of the analog power supply voltage AVDD in the second mode may be different from the voltage level of the analog power supply voltage AVDD.

A first graph 810 in FIG. 22 may represent the reference voltage VREF, a data voltage range VDR1 and the analog power supply voltage AVDD in the first mode, and a second graph 830 in FIG. 22 may represent the reference voltage VREF, a data voltage range VDR2 and the analog power supply voltage AVDD in the second mode. In some embodiments, as illustrated in FIG. 22, in the second mode, the panel driver 120 may decrease the voltage level of the reference voltage VREF from the first voltage level (e.g., about 4.6V) to the second voltage level (e.g., about 1.4V) by a voltage level decrease amount VLDA (e.g., about 3.2V) (S750). In other words, the second voltage level of the reference voltage VREF in the second mode may be lower than the first voltage level of the reference voltage VREF by the voltage level decrease amount VLDA.

Further, in the second mode, the panel driver 120 may determine the data voltage range VDR2 (e.g., having the maximum data voltage VDMAX of about 3.6V) by decreasing the voltage level (e.g., about 6.8V) of the maximum data voltage VDMAX in the first mode by the voltage level decrease amount VLDA of 3.2V (S760). In other words, the voltage level of the maximum data voltage VDMAX in the second mode may be lower than the voltage level of the maximum data voltage VDMAX in the first mode by the voltage level decrease amount VLDA. For example, the data voltage range VDR1 in the first mode may range, but is not limited to, from a minimum data voltage VDMIN of about 1V to the maximum data voltage VDMAX of about 6.8V, and the data voltage range VDR2 in the second mode may range, but is not limited to, from the minimum data voltage VDMIN of about 0.3V to the maximum data voltage VDMAX of about 3.6V.

In addition, in the second mode, the panel driver 120 may generate the analog power supply voltage AVDD (e.g., having the voltage level of about 4.3V) by decreasing the voltage level (for example, about 7.5V) of the analog power supply voltage AVDD by the voltage level decrease amount VLDA of 3.2V (S770). In other words, the voltage level of the analog power supply voltage AVDD in the second mode may be lower than the voltage level of the analog power supply voltage AVDD in the first mode by the voltage level decrease amount VLDA.

As described above, in the display device 100 according to embodiments, in the second mode, the reference voltage VREF may be decreased, the data voltage range VDR2 and/or the maximum data voltage VDMAX may be decreased, and the analog power supply voltage AVDD may be decreased. Accordingly, in the display device 100 according to embodiments, a high brightness and/or high dynamic range image may be displayed in the first mode, and power consumption of the display device 100 may be reduced in the second mode.

Figure 23:
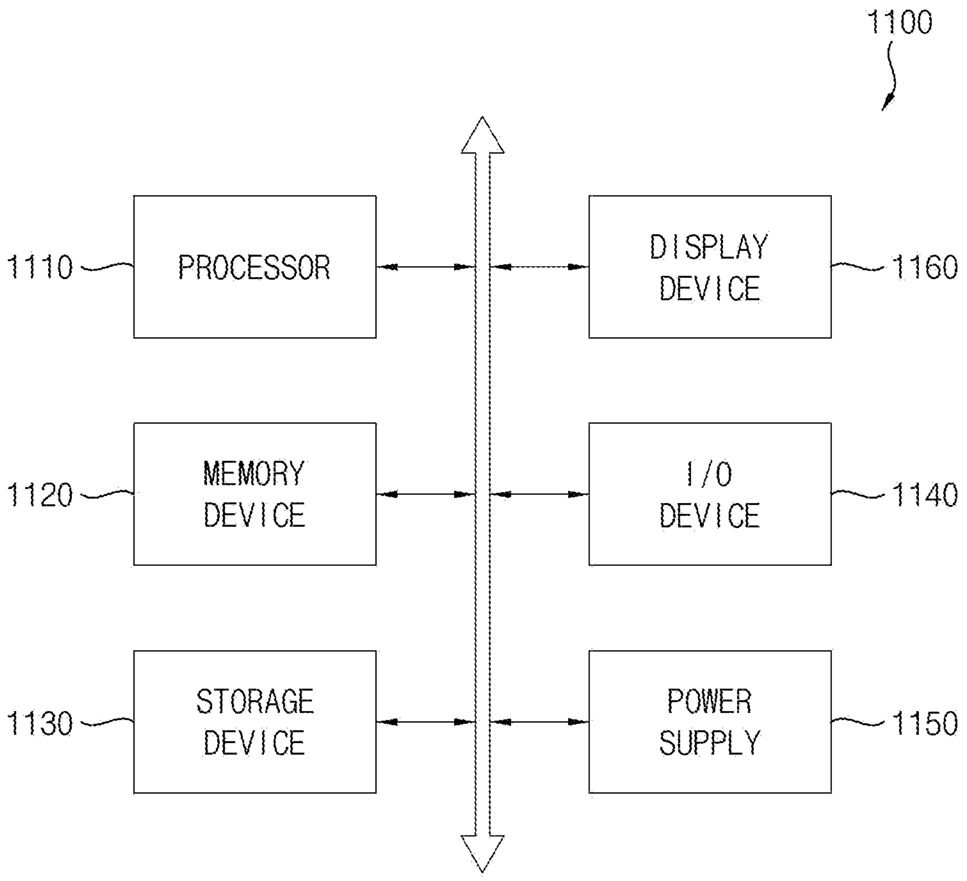
FIG. 23 is a block diagram illustrating an electronic device including a display device according to embodiments.

FIG. 23 is a block diagram illustrating an electronic device including a display device according to embodiments.

Referring to FIG. 23, an electronic device 1100 may include a processor 1110, a memory device 1120, a storage device 1130, an input/output (I/O) device 1140, a power supply 1150, and a display device 1160. The electronic device 1100 may further include a plurality of ports for communicating a video card, a sound card, a memory card, a universal serial bus (USB) device, other electric devices, etc.

The processor 1110 may perform various computing functions or tasks. The processor 1110 may be an application processor (AP), a microprocessor, a central processing unit (CPU), etc. The processor 1110 may be connected to other components via an address bus, a control bus, a data bus, etc. Further, in some embodiments, the processor 1110 may be further connected to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be connected to other components through the buses or other communication links.

In the display device 1160, each pixel may emit light with a luminance corresponding to a difference between a reference voltage and a data voltage, a voltage level of the reference voltage may be changed, and a range of the data voltage may be shifted by a voltage level change amount of the reference voltage. Accordingly, power consumption of the display device 1160 may be reduced while a luminance of the display device 1160 is not changed.

The present inventive concept may be applied to any display device 1160, and any electronic device 1100 including the display device 1160. For example, the inventive concept may be applied to a smartphone, a wearable electronic device, a tablet computer, a mobile phone, a television (TV), a digital TV, a three-dimensional (3D) TV, a personal computer (PC), a home appliance, a laptop computer, a personal digital assistant (PDA), a portable multimedia player (PMP), a digital camera, a music player, a portable game console, a navigation device, etc.

The foregoing is illustrative of embodiments of the present inventive concept and is not to be construed as limiting thereof. Although a few embodiments have been described, those skilled in the art will readily appreciate that many modifications are possible without departing from the scope of the present inventive concept. Accordingly, all such modifications are intended to be included within the scope of the present inventive concept as set forth in the claims.

What is claimed is:

1. A electronic device comprising:

a display device including: a display panel including a pixel; and a panel driver configured to provide a reference voltage and a data voltage to the pixel, wherein the pixel emits light with a luminance corresponding to a difference between the reference voltage and the data voltage, and when the reference voltage changes, and a range of the data voltage is shifted by a voltage level that corresponds to the amount of change in the reference voltage, wherein the pixel includes:

a storage capacitor including a first electrode connected to a first node, and a second electrode connected to a second node;

a first transistor including a gate connected to the second node; and a light emitting element, wherein, in a compensation period, the reference voltage is applied to the first node, and a voltage of the second node becomes a voltage obtained by subtracting a threshold voltage of the first transistor from a power supply voltage, wherein, in a data writing period, the data voltage is applied to the first node, and the voltage of the second node is changed by the difference between the reference voltage and the data voltage, and wherein, in an emission period, the power supply voltage is applied to a source of the first transistor, and a source-gate voltage of the first transistor corresponds to the reference voltage minus the data voltage plus the threshold voltage.

2. The electronic device of claim 1, wherein an analog power supply voltage supplied to an analog circuit of the panel driver changes by the voltage level that corresponds to the amount of change in the reference voltage.

3. The electronic device of claim 1, wherein when the reference voltage decreases, the range of the data voltage is shifted in a negative direction by a voltage level that corresponds to the amount of decrease in the reference voltage.

4. The electronic device of claim 3, wherein a maximum data voltage corresponding to a minimum gray level is decreased by the voltage level that corresponds to the amount of decrease in the reference voltage, and wherein a minimum data voltage corresponding to a maximum gray level is decreased by the voltage level that corresponds to the amount of decrease in the reference voltage.

5. The electronic device of claim 3, wherein an analog power supply voltage supplied to an analog circuit of the panel driver is decreased by the voltage level that corresponds to the amount of decrease in the reference voltage.

6. The electronic device of claim 1, wherein the pixel generates a driving current based on the difference between the reference voltage and the data voltage, and emits light based on the driving current.

7. The electronic device of claim 1, wherein, in the emission period, the first transistor generates a driving current, the light emitting element emits light based on the driving current, and the driving current is determined by an equation, "IDR=k*(VREF−VDAT)^2", where IDR represents the driving current, k represents a constant, VREF represents the reference voltage, and VDAT represents the data voltage.

8. An electronic device comprising:

a display device including: a display panel including a pixel; and a panel driver configured to provide a reference voltage and a data voltage to the pixel, wherein the pixel emits light with a luminance corresponding to a difference between the reference voltage and the data voltage, and when the reference voltage changes, and a range of the data voltage is shifted by a voltage level that corresponds to the amount of change in the reference voltage, wherein the pixel includes:

a storage capacitor including a first electrode connected to a first node, and a second electrode connected to a second node;

a hold capacitor including a first electrode connected to a line for transferring a first power supply voltage, and a second electrode connected to the first node;

a first transistor including a gate connected to the second node, a first terminal connected to the line for transferring the first power supply voltage, and a second terminal;

a second transistor including a gate for receiving a wiring signal, a first terminal connected to a data line, and a second terminal connected to the first node;

a third transistor including a gate for receiving a compensation signal, a first terminal connected to the second terminal of the first transistor, and a second terminal connected to the second node;

a fourth transistor including a gate for receiving an initialization signal, a first terminal connected to the second node, and a second terminal connected to a line for transferring an initialization voltage;

a fifth transistor including a gate for receiving the compensation signal, a first terminal connected to the first node, and a second terminal connected to a line for transferring the reference voltage;

a sixth transistor including a gate for receiving an emission signal, a first terminal connected to the second terminal of the first transistor, and a second terminal connected to an anode of an light emitting element;

a seventh transistor including a gate for receiving a bypass signal, a first terminal connected to the anode of the light emitting element, and a second terminal connected to a line for transferring an anode initialization voltage; and the light emitting element including the anode, and a cathode connected to a line for transferring a second power supply voltage.

9. The electronic device of claim 8, wherein the pixel further includes:

an eighth transistor including a gate for receiving a second emission signal, a first terminal connected to the line for transferring the first power supply voltage, and a second terminal connected to the first terminal of the first transistor; and a ninth transistor including a gate for receiving the bypass signal, a first terminal connected to a line for transferring a bias voltage, and a second terminal connected to the first terminal of the first transistor.

10. The electronic device of claim 8, wherein the pixel further includes:

an eighth transistor including a gate for receiving the emission signal, a first terminal connected to the line for transferring the first power supply voltage, and a second terminal connected to the first terminal of the first transistor;

a ninth transistor including a gate for receiving the bypass signal, a first terminal connected to a line for transferring a bias voltage, and a second terminal connected to the first terminal of the first transistor; and a tenth transistor including a gate for receiving the compensation signal, a first terminal connected to the line for transferring the first power supply voltage, and a second terminal connected to the first terminal of the first transistor.

* * * * *